(12) United States Patent
Wölfing

(10) Patent No.: US 12,092,851 B2
(45) Date of Patent: Sep. 17, 2024

(54) LIGHTING DEVICE WITH A PLURALITY OF LIGHT GUIDING ELEMENTS WITH INCREASING CROSS-SECTIONAL AREA TO REDUCE DIVERGENCY

(71) Applicant: SCHOTT AG, Mainz (DE)

(72) Inventor: Bernd Wölfing, Mainz (DE)

(73) Assignee: SCHOTT AG, Mainz (DE)

(*) Notice: Subject to any disclaimer, the term of this patent is extended or adjusted under 35 U.S.C. 154(b) by 0 days.

(21) Appl. No.: 17/677,270

(22) Filed: Feb. 22, 2022

(65) Prior Publication Data
US 2022/0276427 A1 Sep. 1, 2022

(30) Foreign Application Priority Data

Feb. 26, 2021 (DE) .................... 10 2021 104 700.5

(51) Int. Cl.
  *F21V 8/00* (2006.01)
  *F21W 106/00* (2018.01)
  *F21W 107/30* (2018.01)

(52) U.S. Cl.
  CPC ........ *G02B 6/0008* (2013.01); *F21V 2200/13* (2015.01); *F21W 2106/00* (2018.01); *F21W 2107/30* (2018.01)

(58) Field of Classification Search
  CPC ..... G02B 6/0008; F21W 2107/30; B60Q 3/44
  See application file for complete search history.

(56) References Cited

U.S. PATENT DOCUMENTS

| 4,997,259 A * | 3/1991 | Ichimura | .................. | G02B 6/04 385/115 |
| 5,302,999 A * | 4/1994 | Oshida | .................... | G02B 6/04 355/1 |

(Continued)

FOREIGN PATENT DOCUMENTS

| CA | 979696 | 12/1975 |
| DE | 3216439 | 11/1983 |

(Continued)

OTHER PUBLICATIONS

Machine Translation of JP-06298003-A, retrieved from worldwide.espacent.com on Feb. 13, 2023 (Year: 2023).*

(Continued)

*Primary Examiner* — Abdulmajeed Aziz
*Assistant Examiner* — Steven Y Horikoshi
(74) *Attorney, Agent, or Firm* — Ruggiero McAllister & McMahon LLC

(57) ABSTRACT

A lighting device is provided that includes a light source and an optical element. The light source emits primary light having a primary emission characteristic. The optical element has a light entry face and a light exit face. The optical element includes light guiding elements each forming part of the light entry and exit faces. The light entry faces inject the primary light into the optical element. The light guiding elements each have a boundary surface that totally internally reflects the primary light so that the light exit face emits a secondary light. The optical element reduces a divergence of the primary light such that the secondary light has a secondary emission characteristic with an emission angle ($\beta$) that is smaller than an emission angle ($\alpha$) of the primary emission characteristic. The light exit face is larger than the light entry face.

21 Claims, 24 Drawing Sheets

(56) References Cited

U.S. PATENT DOCUMENTS

| | | | |
|---|---|---|---|
| 5,371,826 A | 12/1994 | Friedman | |
| 5,690,408 A | 11/1997 | De La Pena | |
| 5,999,686 A * | 12/1999 | Leaman | G02B 6/0008 |
| | | | 385/901 |
| 11,480,742 B1 * | 10/2022 | Czarnota | G02B 6/4206 |
| 2003/0021124 A1 | 1/2003 | Elbrecht | |
| 2006/0018031 A1 * | 1/2006 | Takasugi | G02B 23/26 |
| | | | 359/661 |
| 2009/0163342 A1 | 6/2009 | Curdt | |
| 2010/0002443 A1 * | 1/2010 | Schultheis | B60Q 3/56 |
| | | | 362/282 |
| 2010/0220293 A1 * | 9/2010 | Mizushima | H04N 9/3105 |
| | | | 353/34 |
| 2011/0085348 A1 * | 4/2011 | Dobson | G02B 6/4298 |
| | | | 362/551 |
| 2013/0058616 A1 * | 3/2013 | Cote | G02B 6/4471 |
| | | | 29/428 |
| 2013/0188387 A1 * | 7/2013 | Keuper | F21V 29/70 |
| | | | 362/555 |
| 2014/0376868 A1 * | 12/2014 | Ritter | C03C 3/118 |
| | | | 423/618 |
| 2015/0016140 A1 | 1/2015 | Weingärtner | |
| 2015/0043241 A1 * | 2/2015 | Deshazer | C08G 77/42 |
| | | | 362/558 |
| 2016/0011356 A1 * | 1/2016 | Galarza | G02B 6/4476 |
| | | | 362/556 |
| 2017/0153009 A1 * | 6/2017 | Moser | F21V 17/005 |
| 2018/0306980 A1 * | 10/2018 | Madhav | B64C 1/406 |
| 2019/0313497 A1 * | 10/2019 | Wölfing | H05B 47/175 |
| 2019/0329705 A1 * | 10/2019 | O'Kell | B60Q 3/47 |
| 2020/0124817 A1 * | 4/2020 | Ohmori | G02B 6/4471 |
| 2020/0174181 A1 * | 6/2020 | Shahmoon | A61B 1/00167 |
| 2020/0189461 A1 * | 6/2020 | Bennemann | B60K 37/02 |
| 2020/0191359 A1 * | 6/2020 | Hessling-Von Heimendahl | |
| | | | F21V 7/06 |

FOREIGN PATENT DOCUMENTS

| | | | |
|---|---|---|---|
| DE | 102012100233 | 5/2014 | |
| DE | 102013208838 | 3/2015 | |
| EP | 2072477 | 3/2010 | |
| EP | 3270050 | 1/2018 | |
| JP | 06298003 A * | 10/1994 | B60Q 3/44 |

OTHER PUBLICATIONS

Heavy Metal Definition and List, retrieved from https://web.archive.org on Feb. 13, 2023 of a Oct. 14, 2017 snapshot of website https://www.thoughtco.com. (Year: 2017).*

* cited by examiner

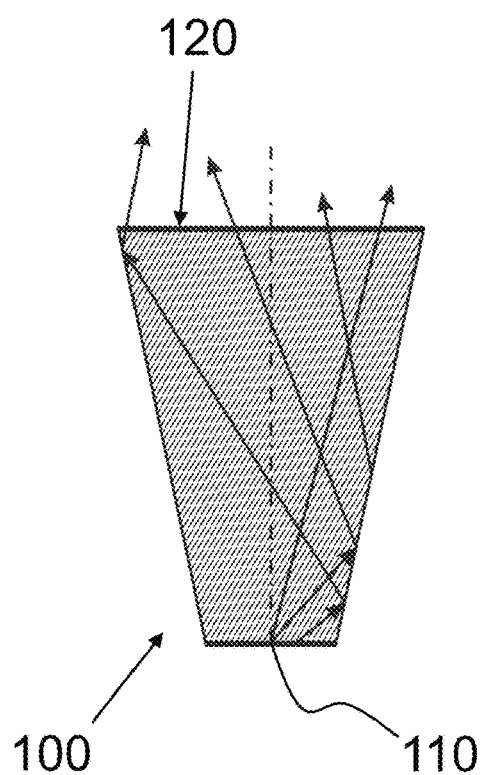
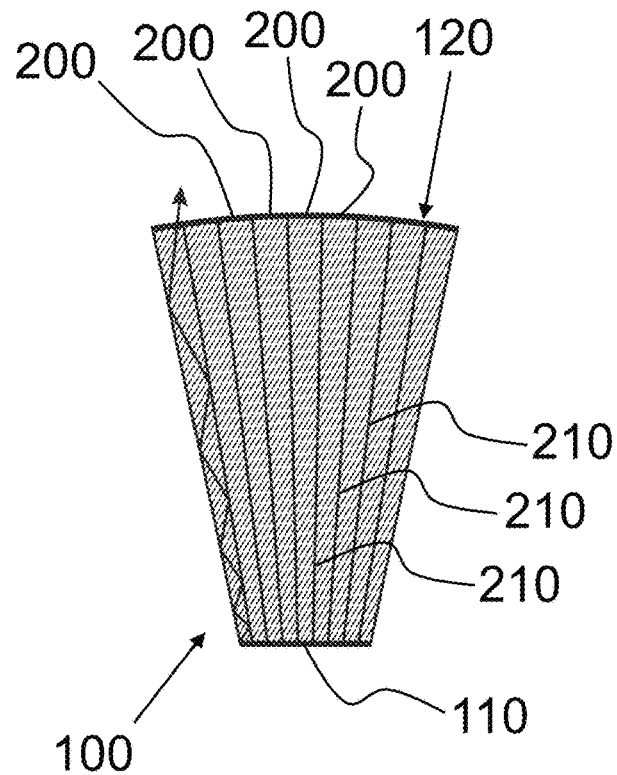
Fig. 5    Fig. 6
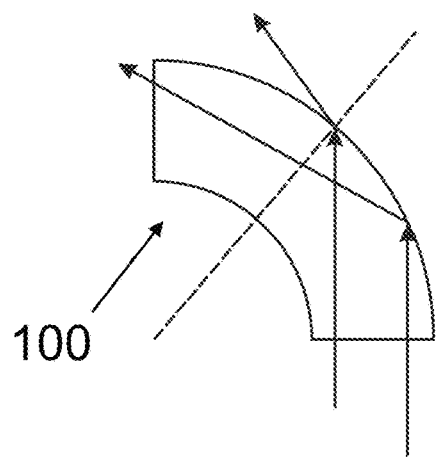
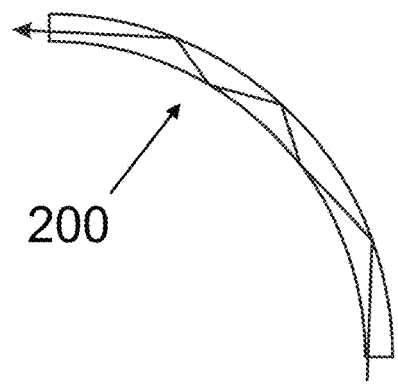
Fig. 7    Fig. 8

LIGHTING DEVICE WITH A PLURALITY OF LIGHT GUIDING ELEMENTS WITH INCREASING CROSS-SECTIONAL AREA TO REDUCE DIVERGENCY

CROSS REFERENCE TO RELATED APPLICATIONS

This application claims benefit under 35 USC § 119 of German Application DE 10 2021 104 700.5 filed Feb. 26, 2021, the entire contents of which are incorporated herein by reference.

BACKGROUND

1. Field of the Invention

The invention relates to a lighting device comprising a light source and an optical element which reduces the divergence of the light and preferably changes the direction of the light, and to a corresponding optical element and to the use of such optical element or of the lighting device, for example in a cabin lining of an aircraft cabin, in or on an aircraft seat, and the like.

2. Description of Related Art

When light-emitting diodes are used as light sources, the emission of light is usually directed, i.e. occurs within a limited solid angle range, however, the divergence of the light is typically rather high, i.e. the opening angle within which the majority of the light is emitted is rather large, for example 120 degrees (±60 degrees). However, for a number of lighting solutions, narrower distributions are desired, e.g. ≤60 degrees (≤±30 degrees).

Solutions are known in which the light is collimated using a spherical or aspherical lens, TIR optics, a mirror, or a combination of such elements, or in which the light cone is simply cut off by means of a diaphragm. According to the physical conditions, the light cone will again widen downstream of the optical element, depending on its degree of collimation. A combination of LED PCB, optics, and support cannot be arbitrarily reduced in size. Typically, the optics have a diameter of at least 5 mm, mostly 10 mm. Standard TIR optics have a diameter of more than 10 mm and a height of more than 8 mm. In the case of requirements with limited installation space at the light exit, for example behind a cabin lining of an aircraft cabin, it is often not feasible to structurally accommodate such components or combinations thereof. An additional drawback is that heat dissipation from the LED is detrimental. On the one hand, no good heat transfer can be achieved due to the limited installation space. On the other hand, the heat is transferred directly to the housing surface and generates undesirably high temperatures there. In particular in cases where the light exit is not perpendicular to the housing surface, these drawbacks are even exacerbated, since the required installation space often increases due to the inclined orientation of the components and/or an additional light path is added, whereby the divergent light cone will enlarge further until it exits the light source.

SUMMARY

The invention is therefore based on the object of specifying a lighting device which, given limited installation space, allows light, for example as originating from a light-emitting diode, to be emitted with a narrow light cone at the light exit, while optimally adjusting the properties of light distribution, e.g. for cabin lights in aircraft.

In order to achieve this object, the invention discloses a lighting device which comprises a light source for emitting light, preferably directed and preferably divergent light, which in particular is provided in the form of a semiconductor-based light source such as a light-emitting diode, and an optical element for reducing divergence and preferably changing the direction of the light emitted by the light source.

The optical element has a light entry face (proximal) for injecting the light emitted by the light source, and a light exit face (distal) for emitting the injected light. Accordingly, the light entry face receives the light emitted by the light source and in particular defines a proximal end of the optical element, which faces the light source. The light exit face which in particular defines a distal end of the optical element, emits the injected light with changed beam characteristics.

The light emitted by the light source accordingly has a primary emission characteristic, and the light emitted from the optical element has a secondary emission characteristic, and the optical element is in particular adapted to convert the primary emission characteristic into the secondary emission characteristic. Specifically, the secondary emission characteristic has an emission angle which is smaller than the emission angle of the primary emission characteristic in order to reduce the divergence of the light emitted by the light source.

In addition, preferably, the optical axis of the light exit face extends obliquely to the optical axis of the light entry face, in order to change the direction of the light emitted by the light source. In this way it becomes possible, for example, to have the light exiting obliquely without need for the light source to be installed according to the inclined, i.e. oblique orientation desired at the light exit. Although an inclined extension of the optical axis of the light exit face relative to the optical axis of the light entry face is preferred, this is not necessary, in principle. It is also possible for the optical axes to extend in parallel to one another or to coincide, i.e. that there is no change in the optical axis.

Most preferably, the optical element comprises a multitude of light guiding elements, each one forming part of the light entry face and part of the light exit face of the optical element, and each one having a boundary surface between the light entry face and the light exit face for reflection of the injected light, in particular total internal reflection at this boundary surface, and the light guiding elements each have a cross-sectional area at the light exit face which is larger than the cross-sectional area at the light entry face, such that the light exit face of the optical element is larger than the light entry face of the optical element.

Due to the enlargement or widening of the cross-sectional area along the direction of light propagation, at least in sections thereof, and the reflection of the light at the boundary surface, a light beam will experience a reduction of its angle relative to the central axis with each reflection at the boundary surface. Thus, because of the larger cross-sectional area of the light guiding element at the light exit face compared to the cross-sectional area at the light entry face, the secondary emission characteristic has an emission angle which is smaller than the emission angle of the primary emission characteristic, so that the divergence of the light emitted by the light source is reduced.

Although a multitude of light guiding elements is particularly preferred, it should not be ruled out that, in a special embodiment, the optical element comprises only one light guiding element, and that the light entry face and the light exit face are defined by the cross-sectional area of the single light guiding element. Below, however, the particularly preferred embodiment with a multitude of light guiding elements will be paramount.

If the optical element comprises not just a single light guiding element but a multitude of light guiding elements, e.g. a multitude of individual fibers, each of which represents a virtually closed optical system by consisting of a core and a cladding, the divergence of the light at the distal end, i.e. at the exit side of the optical element, will advantageously be reduced over shorter lengths of the optical element, given the same enlargement of the cross-sectional area along the direction of light propagation. This will be illustrated further below in conjunction with the description of the figures. An optical element that comprises a large number of light guiding elements is therefore particularly advantageous, in particular for lighting purposes with a given confined installation space.

The optical element preferably comprises a widening section within which the cross-sectional area of the light guiding elements and/or the cross-sectional area of the optical element increases, in particular increases conically. (Here, conically does not refer to a truncated cone, i.e. a constant opening angle, rather, in more general mathematical terms, this refers to a tapering body that is defined by rotation of a curve around an axis, which means that the widening section can in fact include a section with a constant opening angle, but especially at the transition to the cylindrical section at the two ends, the opening angle will gradually increase or decrease, respectively, for reasons related to the manufacturing process. In the limit case of a short widening section, there will be no section with a constant opening angle.) Furthermore, the optical element preferably comprises a curved section within which the optical axis of the optical element extends along a curve, in particular along a circular arc.

The widening section and the curved section are preferably spaced apart from one another along the optical axis, most preferably in a way so that the widening section is located closer to the light entry face and the curved section is located closer to the light exit face.

The optical element can also have one or more rectilinear sections within which the cross-sectional area remains constant and the optical axis extends along a straight line, and the one or more linear section(s) are preferably provided upstream of and/or downstream of the widening section and/or of the curved section, most preferably between the widening section and the curved section.

Preferably, the widening section, the curved section, and/or one or more linear section(s) are formed monolithically with one another along the optical axis.

The secondary emission characteristic may have an emission angle ($\beta$) of less than 60 degrees (i.e. ±30 degrees around the optical axis), preferably less than 50 degrees, most preferably less than 40 degrees.

The optical element may define a ratio between the emission angle ($\beta$) of the secondary emission characteristic and the emission angle ($\alpha$) of the primary emission characteristic of less than 0.7, preferably less than 0.6, most preferably less than 0.5.

Furthermore, the optical element may define a ratio ($\sin \alpha/\sin \beta)^2$ for the emission angle ($\alpha$) of the primary emission characteristic and the emission angle ($\beta$) of the secondary emission characteristic, which is between 2 and 100, preferably between 3 and 50, more preferably between 4 and 25, most preferably between 5 and 15.

The secondary emission characteristic may in particular be characterized by a triple of parameters comprising roundness, inhomogeneity, and stray light proportion.

For example, the secondary emission characteristic can have a roundness of greater than 0.4 and an inhomogeneity of less than 0.35 and a stray light proportion of less than 0.2.

Preferably, the secondary emission characteristic can have a roundness of greater than 0.65 and an inhomogeneity of less than 0.25 and a stray light proportion of less than 0.15.

Most preferably, the secondary emission characteristic can have a roundness of greater than 0.85 and an inhomogeneity of less than 0.2 and a stray light proportion of less than 0.05.

The roundness may preferably be determined by: subdividing the angular space into 8 rotation angle segments ($\varphi 1$, $\varphi 2$, $\varphi 3$, $\varphi 4$, $\varphi 5$, $\varphi 6$, $\varphi 7$, $\varphi 8$), calculating a ratio of minimum intensity in a rotation angle segment to the maximum intensity in a rotation angle segment, and this ratio is 1 in the ideal case and 0 in the worst case.

The stray light proportion may preferably be determined as follows: for each light beam that is emitted outside the target angle range (emission angle $\beta$): calculating the squared deviation of the beam angle from the maximum target angle. weighting the squared deviation with the intensity of the light beam, computing the sum over all light beams, normalizing to the squared maximum target angle.

The inhomogeneity may preferably be determined as follows: calculating the standard deviation of the brightness of segments ($\theta 1$, $\theta 2$, $\theta 3$, $\theta 4$) to the mean value of the brightness of segments ($\theta 1$, $\theta 2$, $\theta 3$, $\delta 4$); evaluating over the target range of light distribution (beam angle $\beta$).

EXAMPLE

Light guide with a face area ratio of 1:9 gives a target range of ±14°. Transfer to solid angle (spherical surface): tilt angle=0 to 14°, rotation angle (azimuth)=0 to 360°. Division of the tilt angle into 12 sections with equal solid angle share. In the case of a light source that is equally bright in all directions (constant light intensity over the target area), the same luminous flux will be emitted into each section (segment). In a real-life application case, usually a planar surface is to be illuminated, which is optionally tilted at a certain angle relative to the optical axis of the light cone. In order to abstract from these different individual cases, the application-independent consideration of constant light intensity was chosen. The standard deviation was chosen as a measure of the deviation between the different segments, since it takes into account all segments. An alternative would be a minimum-to-maximum consideration which, however, can be influenced very strongly by individual segments and therefore does not reflect the overall impression equally well. The standard deviation is divided by the mean value of brightness, since the relative brightness variations are decisive for homogeneity, not the absolute ones.

In the aforementioned definitions for determining roundness, stray light proportion, and inhomogeneity, an emission angle ($\beta$) may preferably be selected such that the aforementioned triples are met; for example, an emission angle can be chosen in the form of a conical solid angle within which 90 percent of the light intensity of the light arrives.

The lighting device is preferably distinguished by a ratio of the surface areas of the light exit face to the light entry face and/or of the cross-sectional areas of the light guiding elements at the light exit face and the light entry face of between 2 and 100, preferably between 3 and 50, more preferably between 4 and 25, most preferably between 5 and 15.

Furthermore, the optical element may have a cross-sectional shape defined perpendicular to the optical axis, which is round, in particular circular, or angular, in particular polygonal, or square, and/or the cross-sectional shape remains congruent along the entire length of the optical axis.

It may be contemplated that the angle between the optical axis of the light exit face and the optical axis of the light entry face and/or the angle defined by the curved section is greater than 10 degrees, preferably greater than 20 degrees, more preferably greater than 30 degrees, or greater than 40 degrees, or greater than 80 degrees.

The curved section or curved portion may deviate from an ideal circular arc, i.e. the curved section may have local curvature radii that are in part larger and/or in part smaller than the radius of the ideal circular arc. Smaller local radii of curvature in portions of the curved section of the light guide may impair the conduction of light, which is possibly hardly or not at all compensated by the less impairment of the light conduction in the other portion having the larger radius. The conduction of the light in the curved section along an ideal circular arc therefore represents the ideal case in optical terms and should therefore be aimed for.

A deviation from the ideal circular arc with larger or even with smaller local radii of curvature may nevertheless be advantageous, since, for example, the deviating shape is easier to produce (in particular there are inlet and outlet portions with a larger local radius of curvature), or the installation space in the installation situation is occupied along the ideal circular arc, so that the curved section has advantageously to be adapted, possibly with a smaller local radius of curvature. As a special case, the curved section may even include one or more straight sections. In this way, a curvature with a large equivalent radius of curvature can be produced, with a deformation made only in some portions. These curved portions deviating from the ideal circular arc can be described by an equivalent radius of curvature. The equivalent radius of curvature corresponds to the radius of curvature of that circular arc which extends congruently with the optical axis of the optical element at least at the beginning of the curved section and at the end of the curved section.

Thus, the curved section within which the optical axis of the optical element is curved, in particular extending along a circular arc, can also be associated with or described by an equivalent radius of curvature, which is greater than 2 millimeters, preferably greater than 4 millimeters, more preferably greater than 8 millimeters, or greater than 16 millimeters, or greater than 32 millimeters, and preferably smaller than 40 millimeters.

As already mentioned above, a multitude of light guiding elements are preferably included. The multitude of light guiding elements in particular comprises at least 10, preferably at least 100, more preferably at least 1000, most preferably at least 10,000 light guiding elements, which are in particular in the form of individual optical fibers bonded to one another, in particular fused together.

Each of the light guiding elements preferably comprises a core and a cladding, and the core has a refractive index which is greater than a refractive index of the cladding, e.g. the refractive index of the core is greater than 1.55, and the refractive index of the cladding is less than 1.55.

Each of the light guiding elements may comprise a core having a diameter of less than 1000 micrometers, preferably less than 200 micrometers, more preferably less than 100 micrometers, or less than 50 micrometers, or less than 16 micrometers, or less than 8 micrometers, or less than 4 micrometers, this diameter being given in particular at the light entry face.

Furthermore, the light guiding elements may each comprise a cladding, and a ratio of the thickness of the cladding to the radius of the core is less than 0.5, preferably less than 0.1, most preferably less than 0.01; and/or the thickness of the cladding preferably is at least 300 nanometers.

According to a preferred embodiment it is contemplated that the ratio of the length of the widening section and the diameter of the core of the light guiding elements, in particular at the light entry face, is at least 10, preferably at least 25, most preferably at least 50.

Furthermore, it is preferably contemplated that the ratio of the radius of curvature of the curved section, in particular the equivalent radius of curvature, and the diameter of the core of the light guiding elements, in particular in the curved section, is at least 10, preferably at least 40, most preferably at least 75.

With regard to the materials, the optical element, in particular the core of the light guiding elements, may comprise or be made of a glass, in particular a multi-component silicate glass. Furthermore, the light guiding elements may comprise a core and a cladding, and the core and/or cladding glass of the light guiding elements are free of lead and/or antimony and/or arsenic and/or other heavy metals, except for unavoidable traces. Moreover, the light guiding elements may have a numerical aperture in air of greater than 0.80, preferably of greater than 0.85, and/or may comprise or be made of a glass system which has an acceptance angle 2α for the light to be guided of greater than 80°, most preferably greater than 100°.

Preferred core glasses comprise the following constituents in the following composition ranges, in percent by weight:

| Constituent | from | to |
|---|---|---|
| $B_2O_3$ | 0 | 24 |
| $SiO_2$ | 23 | 62.1 |
| $Al_2O_3$ | 0 | 10 |
| $Li_2O$ | 0 | 10 |
| $Na_2O$ | 0 | 18.5 |
| $K_2O$ | 0 | 25.7 |
| BaO | 0 | 57.8 |
| ZnO | 0 | 40 |
| $La_2O_3$ | 0 | 25 |
| $ZrO_2$ | 0 | 10 |
| $HfO_2$ | 0 | 14.2 |
| $SnO_2$ | >0 | 2 |
| MgO | 0 | 8 |
| CaO | 0 | 8 |
| SrO | 0 | 24.4 |
| $Ta_2O_5$ | 0 | 22 |
| $Y_2O_3$ | 0 | 11.9 |
| $Rb_2O$ | 0 | 15 |
| $Cs_2O$ | 0 | 21 |
| $GeO_2$ | 0 | 7.5 |
| F | 0 | 2 |
| Σ $R_2O$ | 5 | 20 |
| Σ MgO, CaO, SrO, ZnO | 20 | 42 |

Σ$R_2O$ is the total of the contents of all alkali metal oxides.

One or more of the following constituents may be included in the core glass: $Cs_2O$, $Rb_2O$, MgO, CaO, SrO, $Gd_2O_3$, $Lu_2O_3$, $Sc_2O_3$, $Y_2O_3$, $In_2O_3$, $Ga_2O_3$, and $WO_3$.

The following components should preferably not be contained in the core glass, or only in concentrations of not more than 500 ppm each, which are caused by unavoidable impurities in the raw materials: $TiO_2$, $CeO_2$, $Nb_2O_5$, $MoO_3$, $Bi_2O_3$, PbO, CdO, $T_2O$, $As_2O_3$, $Sb_2O_3$, $SO_3$, $SeO_2$, $TeO_2$, BeO, radioactive elements, and coloring components, unless otherwise described in the text. In particular $TiO_2$ should be dispensed with, since this component can lead to pronounced absorption in the UV range. In preferred embodiments, the component $WO_3$ is also dispensed with.

$TiO_2$, $CeO_2$, $Nb_2O_5$, and/or $Bi_2O_3$ may be contained in the core glass as constituents in an amount of up to 0.5 wt %, preferably up to 0.3 wt %, and most preferably up to 0.2 wt %. In a preferred embodiment, the core glass is free of these components.

The core glass is preferably free of optically active constituents, in particular $Sm_2O_3$, $Nd_2O_3$, $Dy_2O_3$, $Pr_2O_3$, $Eu_2O_3$, $Yb_2O_3$, $Tb_2O_3$, $Er_2O_3$, $Tm_2O_3$, and/or $Ho_2O_3$. $CeO_2$ absorbs in the UV range, so that preferred core glasses do not contain $CeO_2$.

The total content of the alkaline earth metal oxide constituents $La_2O_3$, $Ta_2O_5$, $ZrO_2$, and $HfO_2$ is preferably, and especially for core glasses with refractive indices of more than 1.65, at least 40 wt %, more preferably at least 42 wt %, still more preferably at least 50 wt %, and most preferably at least 55 wt %. If the content of these constituents is too low, it will usually be impossible to achieve the preferred refractive index. Depending on the formulation, this total should not exceed a value of 72 wt %.

In one particular embodiment, the cladding glass has the following features: the cladding glass preferably has an $SiO_2$ content of >60 wt %, more preferably of >65 wt %, and most preferably of at least 69 wt %. The $SiO_2$ content is preferably at most 75 wt % and most preferably up to 73 wt %. The cladding glass tends to be exposed to stronger environmental impacts than the core glass. A high $SiO_2$ content gives better chemical resistance. Consequently, the content of this constituent will preferably be greater in the cladding glass than in the core glass.

The composition of the cladding glass is preferably chosen or adapted to that of the core glass such that the coefficient of linear thermal expansion of the cladding glass and that of the core glass differ as little as possible. Generally, the coefficient of thermal expansion (CTE) in a temperature range from 20 to 300° C. may be the same or different for the fiber core and the fiber cladding. In particular, the CTE is different. Preferably, the CTE of the cladding is smaller than the CTE of the fiber core, typically smaller by at least $1.0*10^{-6}$/K, but may typically even be smaller by at least $2.5*10^{-6}$/K, depending on the glass. The fiber core typically has a CTE between $6.5*10^{-6}$/K and $10*10^{-6}$/K, the cladding has a CTE between $4.5*10^{-6}$/K and $6*10^{-6}$/K. This ensures that the core of the fiber shrinks more than the fiber cladding upon cooling, so that a compressive stress is built up in the fiber cladding, protecting the fiber, which is beneficial for the mechanical strength of the fiber, in particular its flexural strength.

The following table lists some preferred compositions for cladding glasses that can be used in combination with the core glasses. The cladding glasses comprise (in wt % on an oxide basis):

| Oxides | Group 1 | Group 2 | Group 3 | Group 4 |
| --- | --- | --- | --- | --- |
| $SiO_2$ | 70-78 | 63-75 | 75-85 | 62-70 |
| $Al_2O_3$ | 5-10 | 1-7 | 1-5 | 1-10 |
| $B_2O_3$ | 5-14 | 0-3 | 10-14 | >15 |
| $Li_2O$ | free | 0-1 | 0-3 | <0.1 |
| $Na_2O$ | 0-10 | 8-20 | 2-8 | 0-10 |
| $K_2O$ | 0-10 | 0-6 | 0-1 | 0-10 |
| MgO | 0-1 | 0-5 | free | 0-5 |
| CaO | 0-2 | 1-9 | free | 0-5 |
| SrO | 0-1 | free | free | 0-5 |
| BaO | 0-1 | 0-5 | free | 0-5 |
| Halogen | free | free | free | free |

Particularly advantageously, the optical element comprises or is made of a Pb- and heavy metal-free core glass and cladding glass. Such glass systems in particular offer high transmittance in the VIS spectral range and, due to the comparatively high transmittance in the blue spectral range, show high color fidelity. This allows to provide lighting devices which, as an overall system made up of light source and light guide (optical element), provide for illumination with hardly any change in the CRI (Color Rendering Index) of the light source, especially in the case of illumination with white light, e.g. a white LED as the light source. Such glass systems are known from the Applicant under the trade name of SCHOTT PURAVIS® and are described with regard to their compositions in DE 102012100233 B4 and DE 102013208838 B4. Similar fiber systems are also described in EP 2072477 B1, which are free of Pb as well.

It can be advantageous if the optical element is made of a glass system which has an acceptance angle $2\alpha$ for the light to be guided of greater than 80°, most preferably greater than 100°, which corresponds to a numerical aperture (NA) of greater than 0.64, most preferably greater than 0.77. What can be achieved in this way is that in particular light from LEDs, which usually have a very wide emission angle, can be injected into the optical element without complex optics at the proximal end, without causing elevated injection loss.

The invention furthermore relates to an optical element for reducing the divergence and preferably for changing the direction of light, in particular for a lighting device as described above. The optical element of the invention may in particular have one or more of the features which have been disclosed for the optical element in conjunction with the lighting device described above.

Accordingly, the optical element comprises a light entry face for injecting light having a primary emission characteristic, and a light exit face for emitting the injected light with a secondary emission characteristic, the secondary emission characteristic having an emission angle ($\beta$) which is smaller than the emission angle of the primary emission characteristic, in order to reduce the divergence of the light.

The optical axis of the light exit face preferably extends obliquely relative to the optical axis of the light entry face in order to change the direction of the light.

The optical element furthermore comprises a multitude of light guiding elements, each one forming part of the light entry face and part of the light exit face, and each one having a boundary surface between the light entry face and the light exit face for reflection, in particular total internal reflection of the injected light at this boundary surface.

The light guiding elements each have a cross-sectional area at the light exit face, which is larger than the cross-sectional area at the light entry face, in particular such that the light exit face is larger than the light entry face.

In the case of a primary emission characteristic which essentially follows a Lambertian characteristic that is typically given in LEDs, the optical element can in particular exhibit the following value triples for roundness, inhomogeneity, and stray light proportion of the secondary emission characteristic. The secondary emission characteristic has a roundness of greater than 0.4 and an inhomogeneity of less than 0.35 and a stray light proportion of less than 0.2, preferably has a roundness of greater than 0.65 and an inhomogeneity of less than 0.25 and a stray light proportion that is less than 0.15, most preferably has a roundness of greater than 0.85 and an inhomogeneity of less than 0.2 and a stray light proportion of less than 0.05.

The invention also relates to a lighting device or an optical element according to the above description with dimensions of the optical element perpendicular to the optical axis, in particular perpendicular to the optical axis of the light entry face, of less than 10 millimeters, preferably less than 7 millimeters, most preferably less than 6 millimeters, in order to enable installation behind a lining such as the interior lining, in particular cabin lining of an aircraft, in or on a seat, e.g. an aircraft seat, preferably in such a way that the optical axis of the light entry face extends in parallel to the interior lining and/or the optical axis of the light exit face extends obliquely to the interior lining.

The invention also relates to the use of a lighting device or an optical element as described above for being installed behind a lining such as an interior lining which has a light exit opening, for example a cabin lining of an aircraft cabin, in or on a seat such as an aircraft seat.

Finally, the invention relates to a diagnostic, surgical and/or therapeutic device comprising a lighting device or an optical element as described above, with the optical element preferably comprising or consisting of a core glass and/or a cladding glass, which are free of Pb or of heavy metals, and/or with the optical element preferably comprising or consisting of a glass system which has an acceptance angle $2\alpha$ for the light to be guided of greater than 80°, most preferably greater than 100°.

BRIEF DESCRIPTION OF THE DRAWINGS

The invention will now be explained in more detail with reference to some figures, wherein:

FIG. 5 shows an optical element consisting of a single light guiding element;

FIG. 6 shows an optical element including a multitude of light guiding elements;

FIG. 7 shows a curved optical element consisting of a single light guiding element;

FIG. 8 shows a curved light guiding element of an optical element that includes a multitude of light guiding elements;

DETAILED DESCRIPTION

Figure 1:
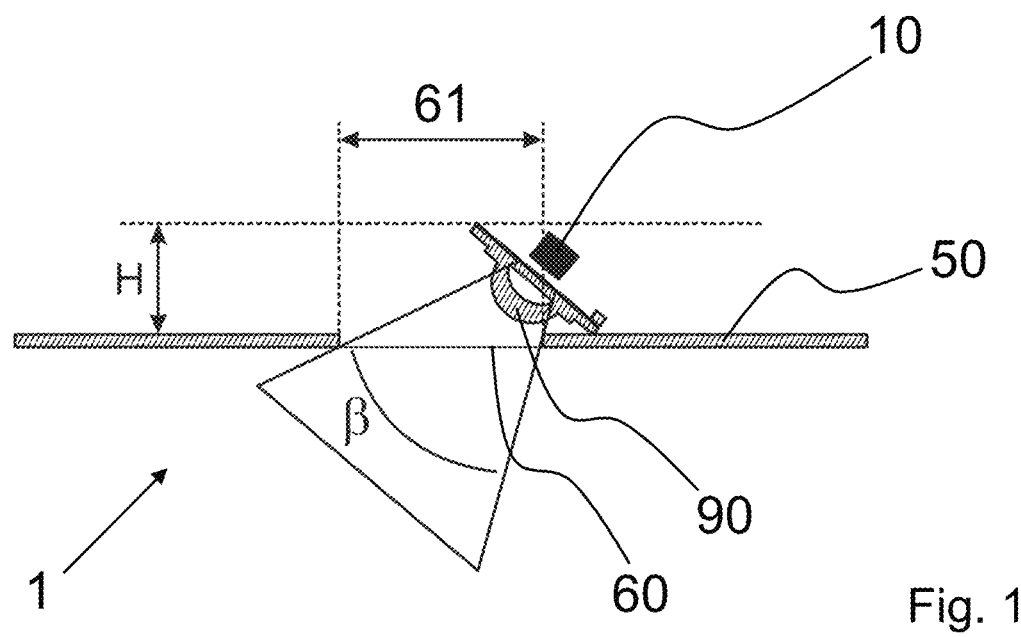
FIG. 1 is a schematic view of a lighting device which is arranged behind a wall that has a light exit opening, with the lighting device comprising a lens.

FIG. 1 shows a lighting device 1 which is arranged behind a wall 50 that has a light exit opening 60, for example an interior lining of an aircraft. Lighting device 1 comprises a light source 10 and a lens 90 in order to reduce the divergence of the light emitted by the light source 10 and to allow for a narrower emission angle $\beta$. Since the light is desired to exit in an oblique manner in this example, the lighting device 1 is installed obliquely behind the wall 50. The reason for this is that in a case where an assembly includes lenses, the beam direction is typically predetermined and therefore the geometry of the lighting device is not very flexible as long as no further elements such as mirrors are provided, which in turn increase complexity and, at least in the case of plane mirrors, hardly cause any change in emission characteristics. A drawback of the solution with an oblique or inclined assembly is that the installation space for the lighting device 1, in particular the height H, is rather high. Another drawback is that the dimension 61 of the light exit opening 60 for the emission angle $\beta$ is rather large, since, due to the inclination, the lens 90 is spaced apart from the opening 60 by a rather large distance.

Figure 2:
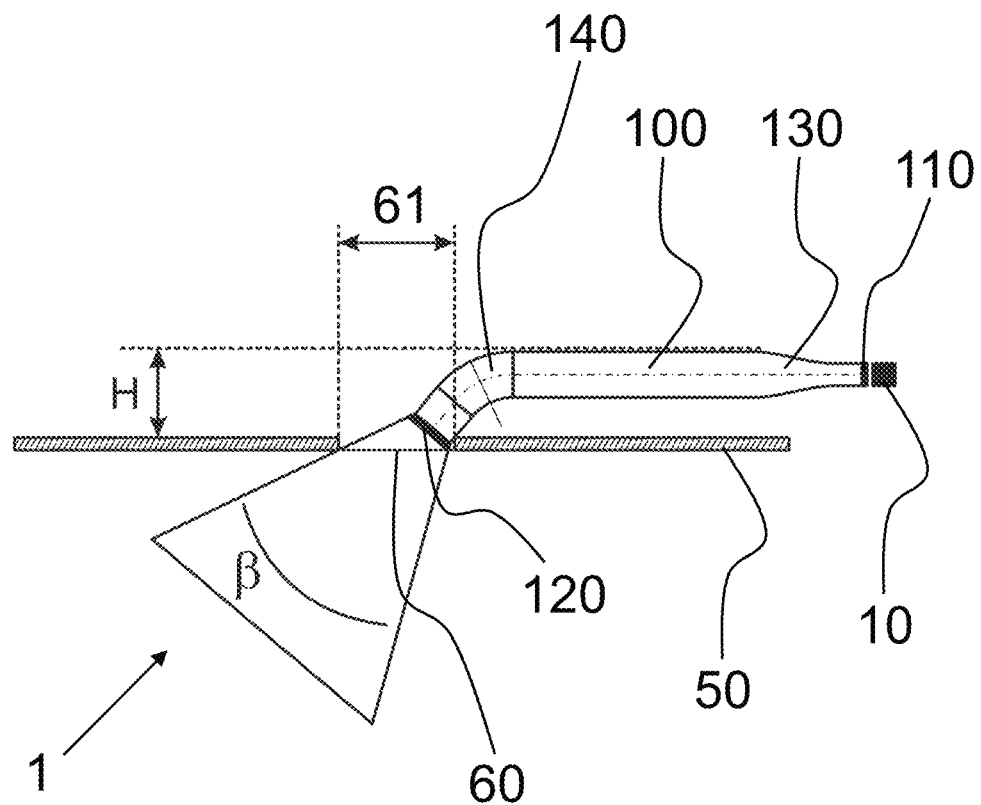
FIG. 2 is a schematic view of a lighting device which is arranged behind a wall that has a light exit opening, with the lighting device comprising an optical element including a multitude of light guiding elements.

By contrast, FIG. 2 shows a lighting device 1 according to the invention, comprising a light source 10 and an optical element 100. The light source may, for example, comprise one or more LEDs or, more generally, semiconductor-based light sources. The optical element 100 is in the form of a light guide, such that the light injected by the light source 10 will be directed along the optical axis of the optical element 100 by reflection at boundary surfaces of individual light guiding elements (see FIG. 10), which extend between the light entry face 110 and the light exit face 120. As a result, the light source 10 can be arranged at a proximal end of the optical element 100, which is almost arbitrarily far away from the light exit opening 60, which moreover has the advantage that heat will not be dissipated directly behind the wall 50 at the opening 60. In addition to guiding the light, the optical element 100 also serves to modify the emission characteristics of the light source 10, so that, for example, the emission angle of the light source can be reduced in order to obtain a narrow emission angle $\beta$. For this purpose, the lighting device 1 has a widening section 130 within which the cross-sectional area of the optical element 100 increases. In the illustrated example, the lighting device 1 moreover has a curved section 140 in order to allow for the desired oblique light exit. The lighting device 1 according to the invention thus provides for a low installation height H. Since the light exit face 120 can be arranged directly adjacent to the opening 60, this moreover allows for a small dimension 61 of the light exit opening 60.

Figure 3:
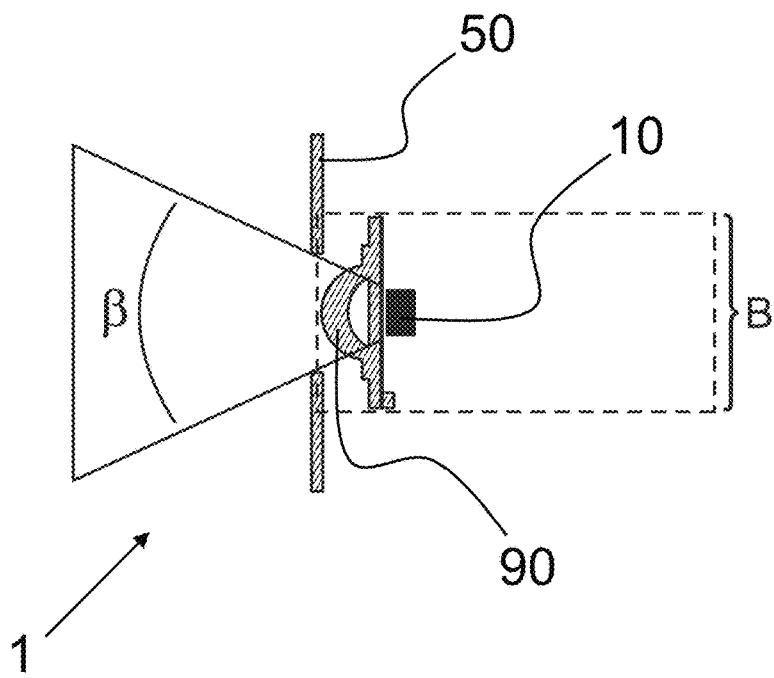
FIG. 3 is a schematic view of a further lighting device which is arranged behind a wall that has a light exit opening, with the lighting device comprising a lens.

FIG. 3 shows a further lighting device 1 comprising a lens 90 which allows the light to exit perpendicular from an opening in a lining 50. A drawback of this solution is that a rather large installation space with respect to the width B is required behind the lining 50. Moreover, again in this case, a relatively large opening is required, due to the spacing between lens 90 and the light exit opening.

Figure 4:
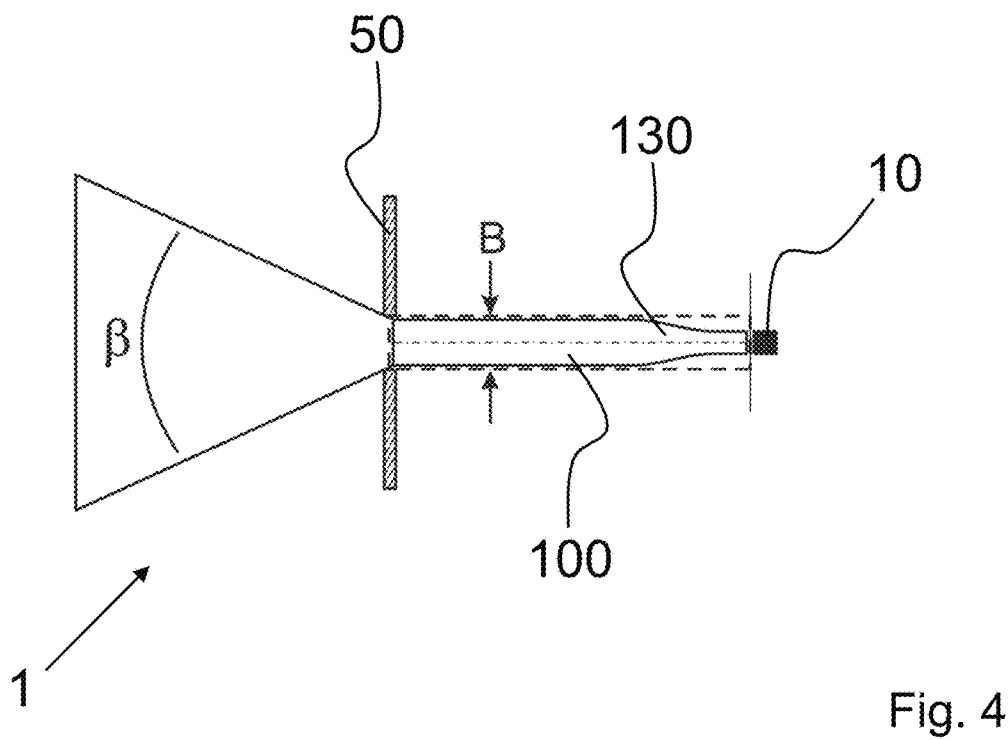
FIG. 4 is a schematic view of a further lighting device which is arranged behind a wall that has a light exit opening, with the lighting device comprising an optical element including a multitude of light guiding elements.

By contrast, FIG. 4 again shows a lighting device 1 according to the invention, comprising a rectilinear optical element 100 which allows to reduce the required installation space with respect to the width B and the size of the light exit opening.

FIG. 5 shows an optical element 100 which comprises only a single light guide. In this case, the optical element is in the form of a monolithic conical or tapering light guide. Due to the widening of the cross section, with each reflection on the outer surface a light beam experiences a reduction in inclination with respect to the central axis. In the illustrated cone or taper which has outer surfaces that are inclined by 10°, the angle is reduced by 20° for each reflection. However, the number of reflections is only 0 to 2 in this example.

Since the light beam is deflected towards the optical axis at the interface to the optically denser medium (glass or plastics material of the light guide, with a refractive index usually between 1.4 and 2.0), the maximum angle occurring in the light guide will be 30° to 50°. A typical LED with Lambertian radiation emits 75% of its radiation power in an angular range of 0° to ±60°. After the transition into the optical medium, most of the angles are between 0° and ±250 (refractive index 2.0) and ±38° (refractive index 1.4).

If, for example, the light of an LED is desired to be collimated so strongly that the initial emission angle is reduced from ±600 to ±200 or +15°, a cone or taper with a ratio of the diameter of the entry face 110 to the diameter of the exit face 120 of 1:2.5 or 1:3.4 would be required. If the taper has a diameter of 1 mm on the entry side, this will result in a diameter of 2.5 mm or 3.4 mm, respectively, at the exit.

If, for example, an outer surface with an inclination of 1° is chosen, this results in a calculated height of the taper of more than 40 mm (2.5 mm at exit side) or almost 70 mm (3.4 mm at exit side). Even in the case of such lengths, a large proportion of the rays will only be reflected 5 times or less. This will lead to an angle discretization and thus to the formation of light and dark rings in the far field. On the other hand, an installation space for optical elements of 40 mm or 70 mm is not available in the first place for many lighting devices.

By contrast, FIG. 6 shows an optical element 100 comprising a multitude of light guiding elements 200, each one having a boundary surface 210 for reflecting light.

If the optical element is not monolithic, but is made up of individual fibers 200, each one representing a virtually closed optical system by virtue of their core and cladding, the diameter of each individual fiber cone 200 is reduced by a factor of 1/square root of (number of fibers). For an exemplary number of fibers of 1000, this means a reduction in diameter by a factor of more than 30.

If, now, the outer surface of each individual fiber 200 had an angle of inclination of 10 as in the above example of the monolithic cone, the optical element could be shortened from 40 mm or 70 mm to between 1.3 mm and just over 2 mm.

However, for manufacturability of the cones or tapers, an inclination of the conical surface of about 100 to 300 can be advantageous. The length of the taper then ranges from 1.3 mm (1:2.5 with 300 inclination) to just under 7 mm (1:3.4 with 100 inclination). It will thus be significantly shorter than for monolithic cones. If a taper with a length of 10 mm is chosen, a significantly larger aspect ratio (length of the taper to the diameter of the optical element at the entry side) is obtained, since the total diameter (in this example 1 mm) must be taken into account in the case of the monolithic cone, but only the diameter of the individual fiber (in this example approx. 0.03 mm) for the fiber element. The aspect ratio for the fiber cone of 10 mm in length is 300:1, compared to 40:1 or 70:1 for a monolithic cone. This increases the number of internal reflections and thus minimizes ring formation. The result is a significantly smaller optical element 100 that is compatible with the installation space and has a significantly improved optical function.

FIG. 7 shows an optical element 100 which is in the form of a monolithic light guide with a bend. The bending radius is in the order of magnitude of the diameter of the light guide. Compliance with the condition for total internal reflection is not given in every case. Redirection occurs through a few reflections. This leads to a widening of the angles.

By contrast, FIG. 8 shows an exemplary light guiding element 200 of an optical element which comprises a multitude of light guiding elements 200, i.e. a light guide made up of individual fibers, for example. In the individual fiber 200 with the same given radius of curvature, the light is directed towards the optical axis of the fiber while maintaining the angle, through many individual reflections.

In contrast to a monolithic light guide, a fiber optic light guide therefore allows light to be guided around narrow bending radii more efficiently, or with lower losses, and without widening the beam cone. A fiber optic light guide with a diameter of 3 mm can be curved with a radius of curvature of 3 mm on the inner side. This allows to redirect the beam within a limited installation space.

Therefore, while a monolithic optical element 100 is in principle conceivable for special embodiments, it is advantageous, in particular in the case of a curvature, if the optical element 100 comprises a multitude of individual light guiding elements 200.

Figure 9:
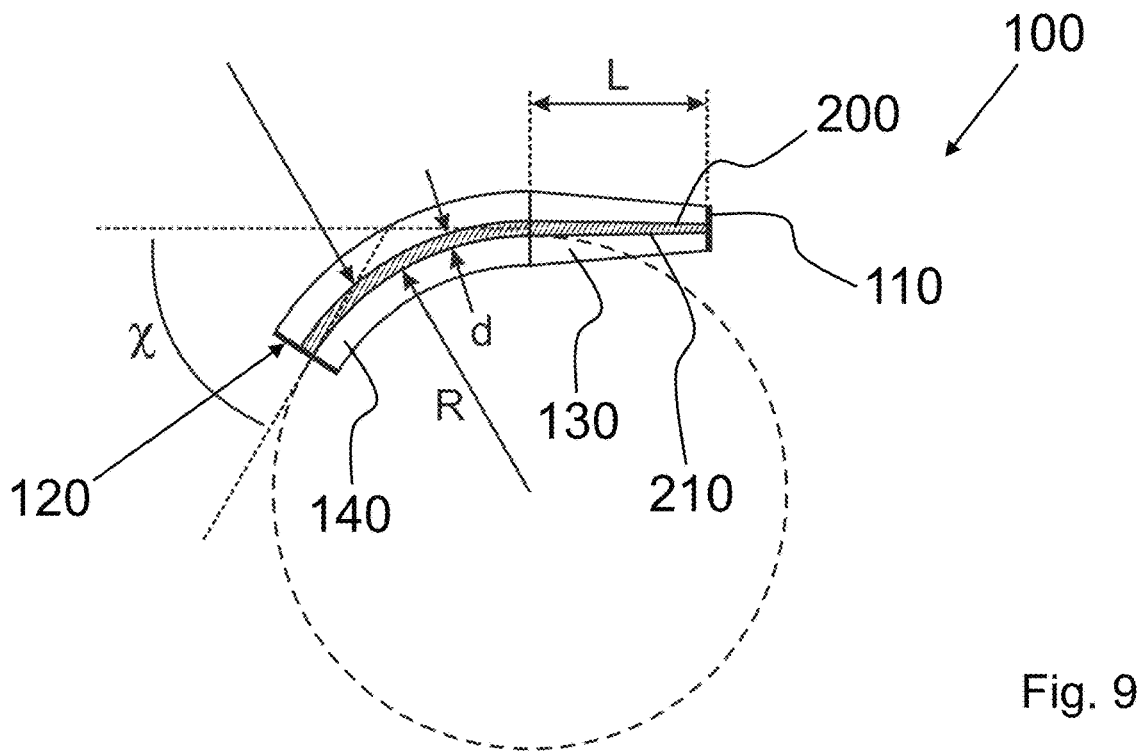
FIG. 9 shows an optical element comprising a widening section and a curved section.

FIG. 9 shows an optical element 100 according to the invention, which comprises a widening section 130 within which the cross section d of the light guiding elements and the cross section of the optical element increases, in this example increases conically, and which comprises a curved section 140 within which the optical axis of the optical element 100 extends in a curved manner, in this example extends along an arc of radius R. The optical element 100 comprises a multitude of light guiding elements 200, one of which is highlighted in the figure, by way of example. The light guiding elements each have a core and a cladding with different refractive indices.

The light guide comprises a multitude of light guiding elements 200, e.g. 100 to 10,000, or 500 to 5000, which can be in the form of individual fibers that are fused together in a common drawing process, for example. In the conical widening section 130, the diameter of the overall light guide changes and that of the individual fibers also changes, proportionally thereto. The change in diameter can be between 1:1.5 and 1:10, for example, or between 1:2 and 1:5.

The light entry face 110 (circumference or inscribed circle) can be at least large enough such that the entire light entry face is covered by the light-emitting surface of a light source, i.e. an LED chip, for example (maximum brightness per unit area, light losses in the corners of the LED chip). Furthermore, the light entry face 110 may preferably be at most large enough such that the entire surface area of the light-emitting LED chip is covered by the light guide (maximum efficiency, dark areas in the light guide).

Furthermore, the optical element 100 is preferably installed in a non-transparent housing which only has an optical opening on the light-emitting end face (light exit face 120), from which the light can exit. The housing may partially comprise a transparent material (glass or plastics material) and may be made non-transparent in the non-light-emitting area by a surface treatment (printing, painting, etching, sandblasting, coating, vapor deposition, etc.). The transition may be smooth.

As also shown in FIG. 9, the optical element 100 may be curved, preferably within the range of the larger diameter, but possibly also within the range of the smaller diameter, or also within the range of the widening, in order to direct the light in a direction that does not correspond to the initial emission direction of the light source.

On the side facing the light source 10, the optical element 100 may have an angular shape in order to simultaneously obtain the highest possible efficiency and a minimum number of dark areas. This can be achieved, for example, by hot-forming (pressing) of the light guide.

The optical element 100 may be optically bonded to the LED chip using a transparent material, e.g. a silicone, in order to minimize reflection losses. This bond may also be implemented in the form of an adhesive bond that has a mechanical function.

A diffusing element or another optical element, for example a fixed or variable diaphragm, can be arranged downstream of the optical element 100, in order to be able to vary the width of the light cone for a given light guide. The diffusing element may also serve to make the edge of the light spot softer or to conceal undesired color errors.

The light guides assigned to different LEDs may differ in their aspects, if different functions are assigned to the LEDs. The light guide can be pressed. The light exit can be shaped. The light guide may have any desired shape along the transfer length in order to transfer the light through a confined space.

Figure 10:
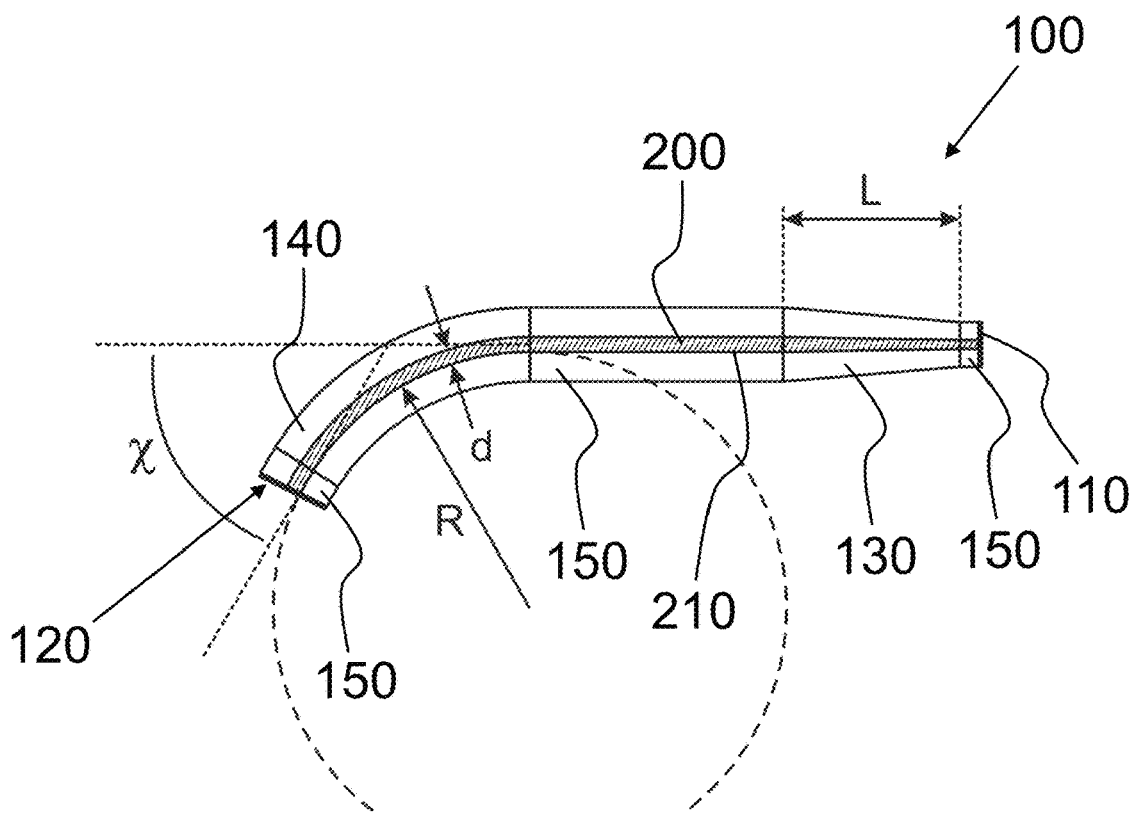
FIG. 10 shows an optical element comprising a widening section, a curved section, and a plurality of linear sections.

FIG. 10 shows a further optical element 100 according to the invention, which is similar to the optical element 100 of FIG. 9 in many aspects. It additionally comprises rectilinear sections 150, each one having a straight optical axis. The linear sections 150 at the proximal and distal ends may be made very short; they may be production-related and will preferably not have any noticeable optical effect in this case. The intermediate rectilinear section 150 geometrically bridges the distance between light source and light exit in the structure of the lighting device. Due to the absorption in the cladding, this straight length may have an impact on the angular distribution. However, since the angles are already significantly reduced in the optically upstream cone and very great angles are absorbed in the cladding, this length will preferably also not significantly influence the light distribution.

Figure 11:
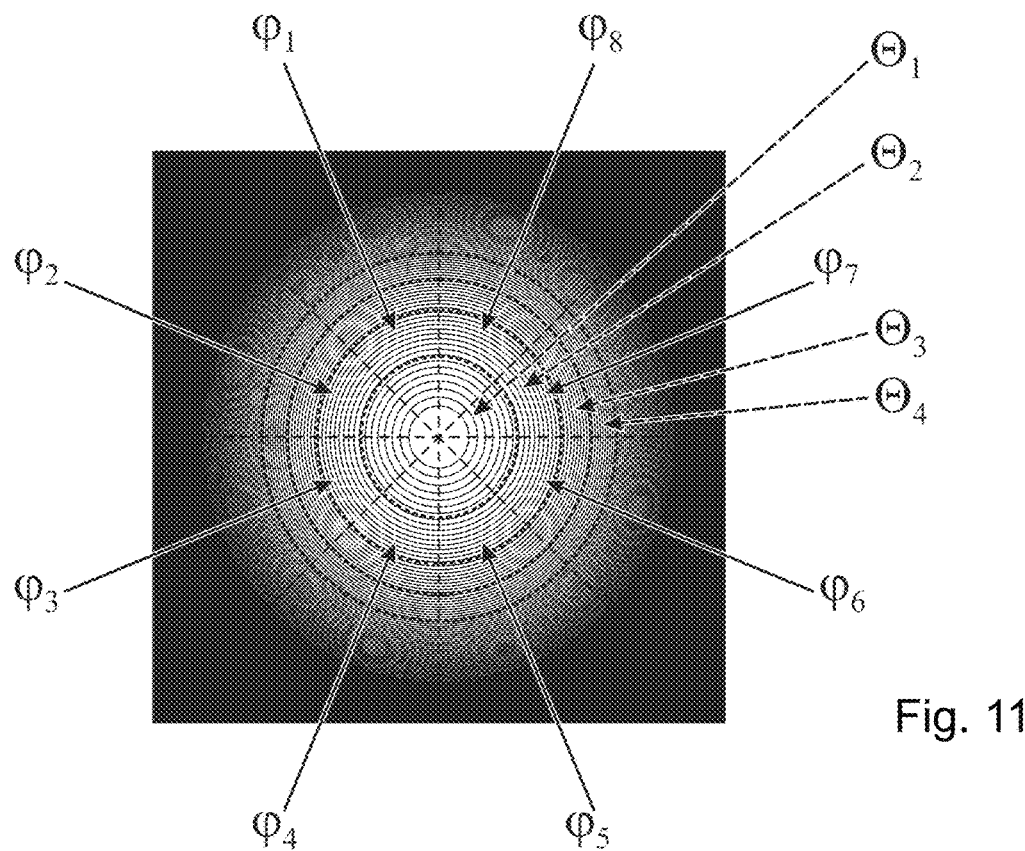
FIG. 11 schematically illustrates a distribution of light intensity in a plane perpendicular to the secondary optical axis.

FIG. 11 shows a schematic distribution of the light intensity in a plane perpendicular to the optical axis. The azimuthal solid angle segments θ1, θ2, θ3, θ4 as illustrated are in particular used for calculating an inhomogeneity of the secondary emission characteristic. The polar solid angle segments φ1, φ2, φ3, φ4, φ5, φ6, φ7, φ8 as illustrated are in particular used for calculating a roundness.

Figure 12:
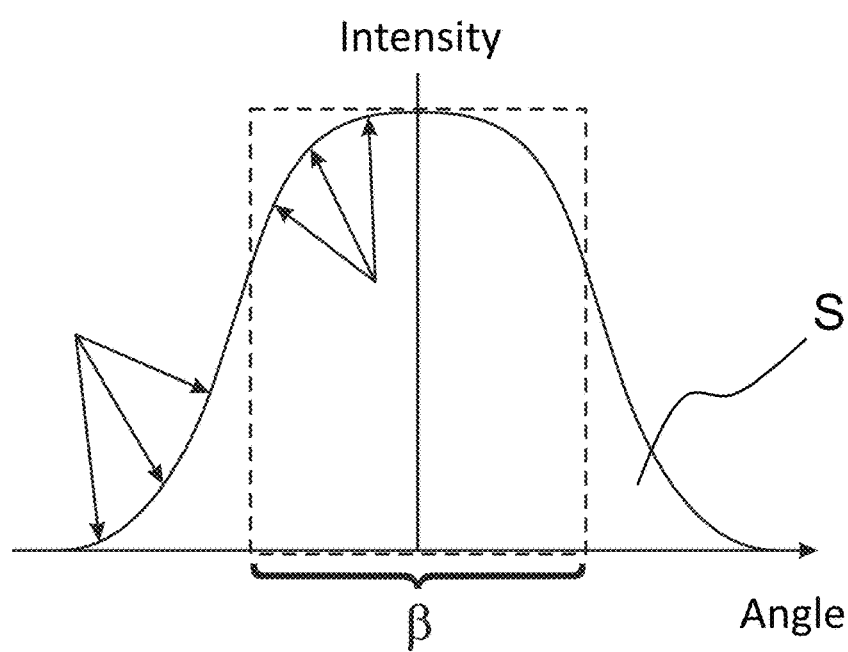
FIG. 12 schematically illustrates a distribution of light intensity in a plane perpendicular to that of FIG. 11.

FIG. 12 shows a schematic distribution of the light intensity in a plane perpendicular to the distribution shown in FIG. 11. The emission angle is denoted by β and can be specified, for example such that 90% of the light is encompassed within this emission angle. The light outside thereof is then referred to as stray light S.

Figure 13:
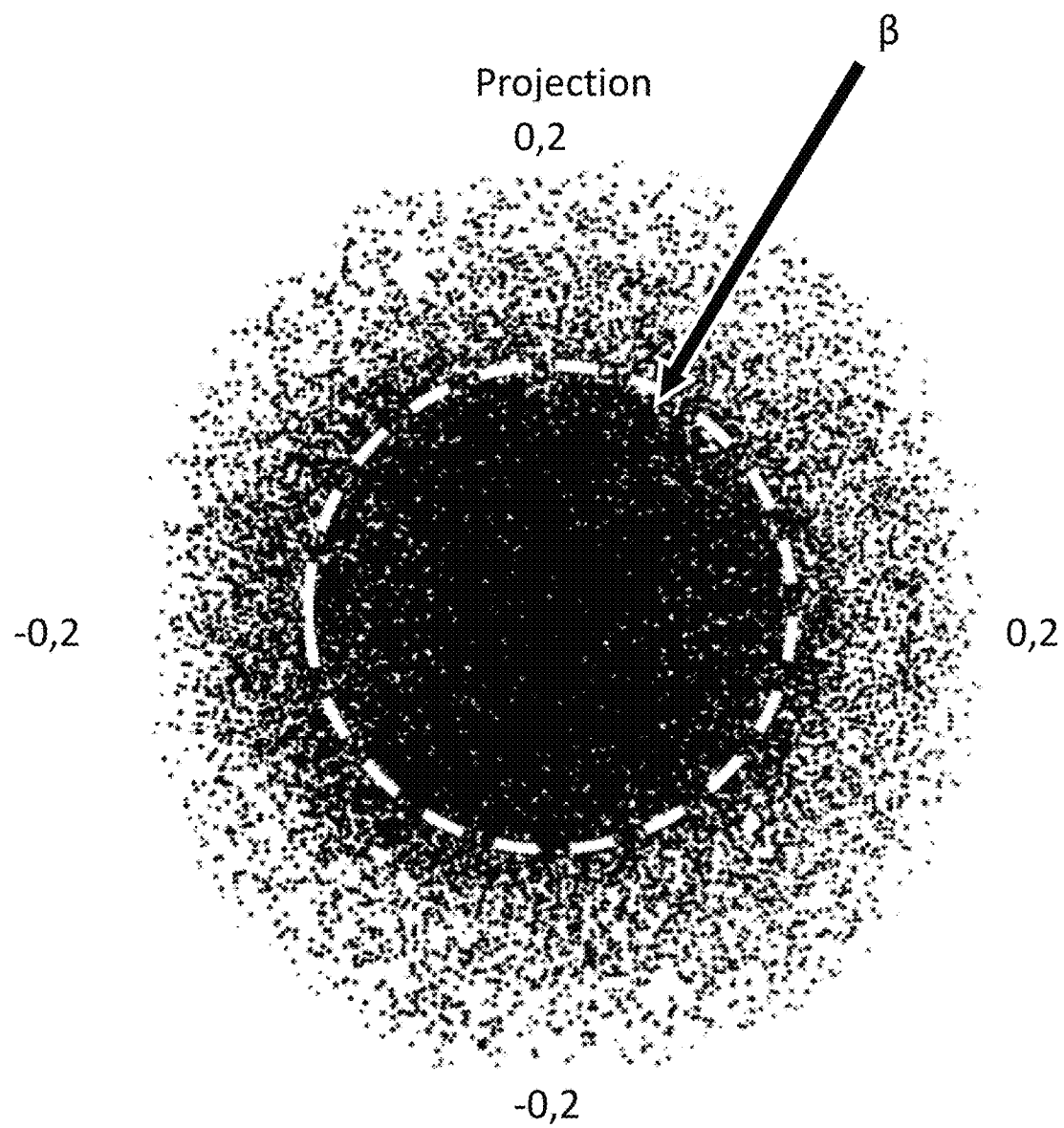
FIGS. 13-25 schematically show exemplary distributions corresponding to the views in FIGS. 11 and 12, which were generated by a computer experiment.
Figure 13:
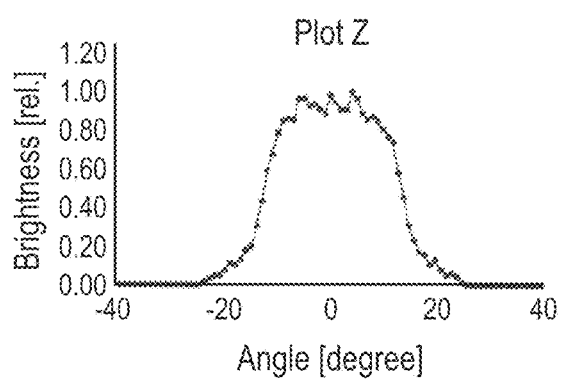
Figure 13:
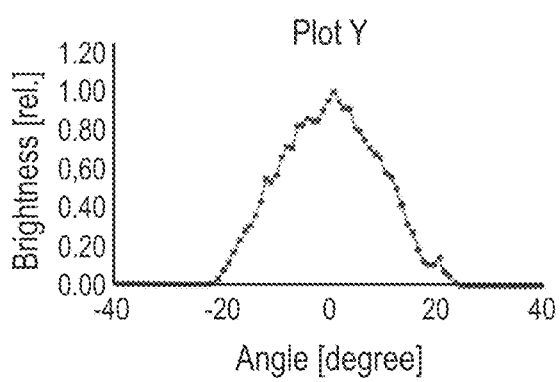

FIGS. 13 through 25 schematically show exemplary distributions corresponding to the planes in FIGS. 11 and 12, which were generated by computer simulation on the basis of an optical system according to FIG. 9, by varying the core radius at the light entry face and the core radius at the light exit face. The parameters on which the figures are based are listed below, and with reference to FIGS. 9 and 10 the widening length corresponds to the length of the widening section (L), the bending radius corresponds to the (equivalent) radius of curvature of the curved section (R), the bending angle corresponds to the angle between the optical axis of the light entry face and the optical axis of the light exit face (X), and the core radius corresponds to the radius of a core of a light guiding element in the optical element:

| FIG. 13 | Taper | Curve |
|---|---|---|
| Widening length | 5.00E−03 m | |
| Core radius light entry | 1.500E−05 m | 4.500E−05 m |
| Core radius light exit | 4.500E−05 m | |
| Bending radius | | 4.500E−03 m |
| Bending angle | | 40.00° |

Figure 14:
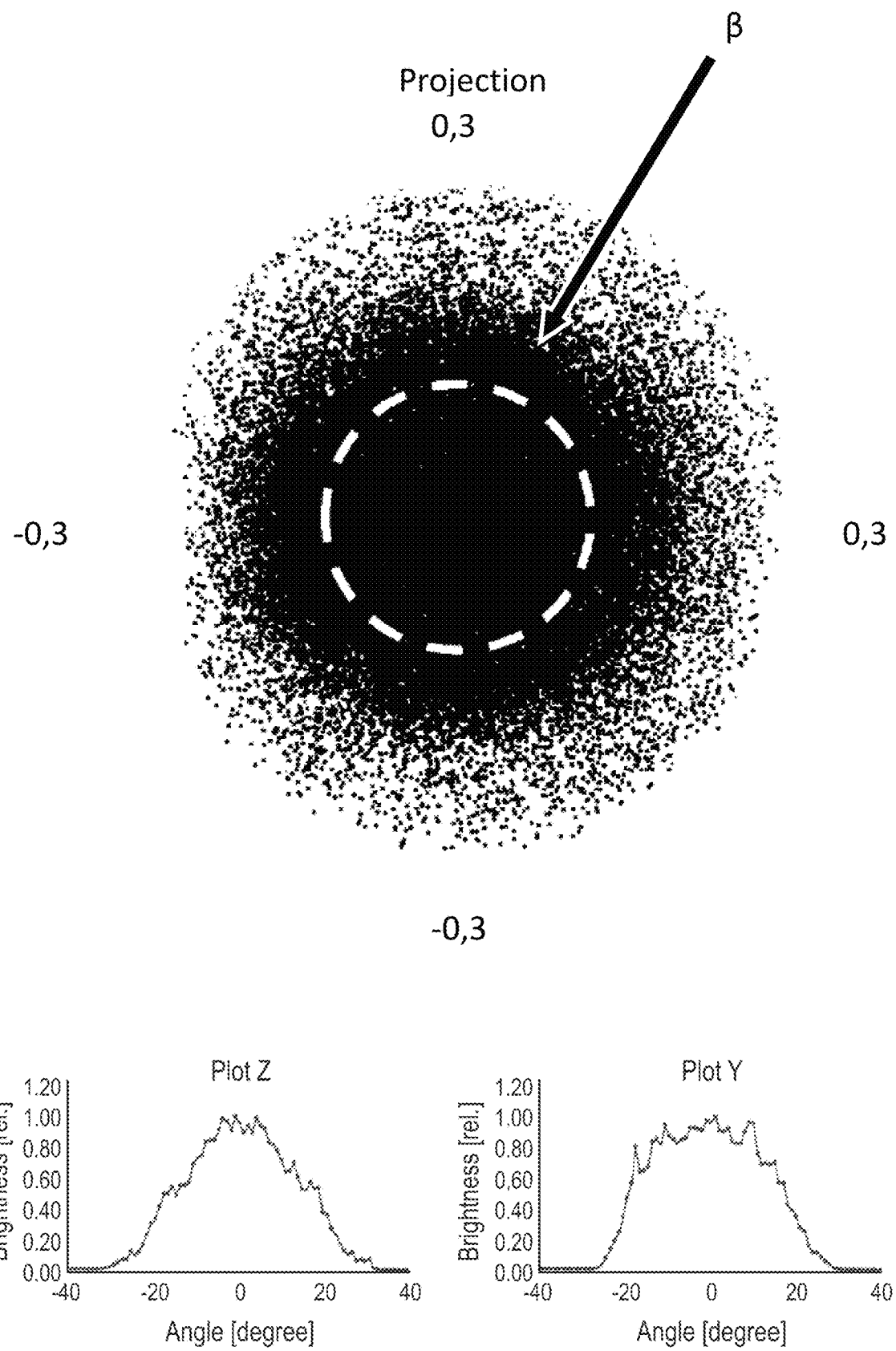

| FIG. 14 | Taper | Curve |
|---|---|---|
| Widening length | 5.00E−03 m | |
| Core radius light entry | 3.000E−05 m | 9.000E−05 m |
| Core radius light exit | 9.000E−05 m | |
| Bending radius | | 4.500E−03 m |
| Bending angle | | 40.00° |

Figure 15:
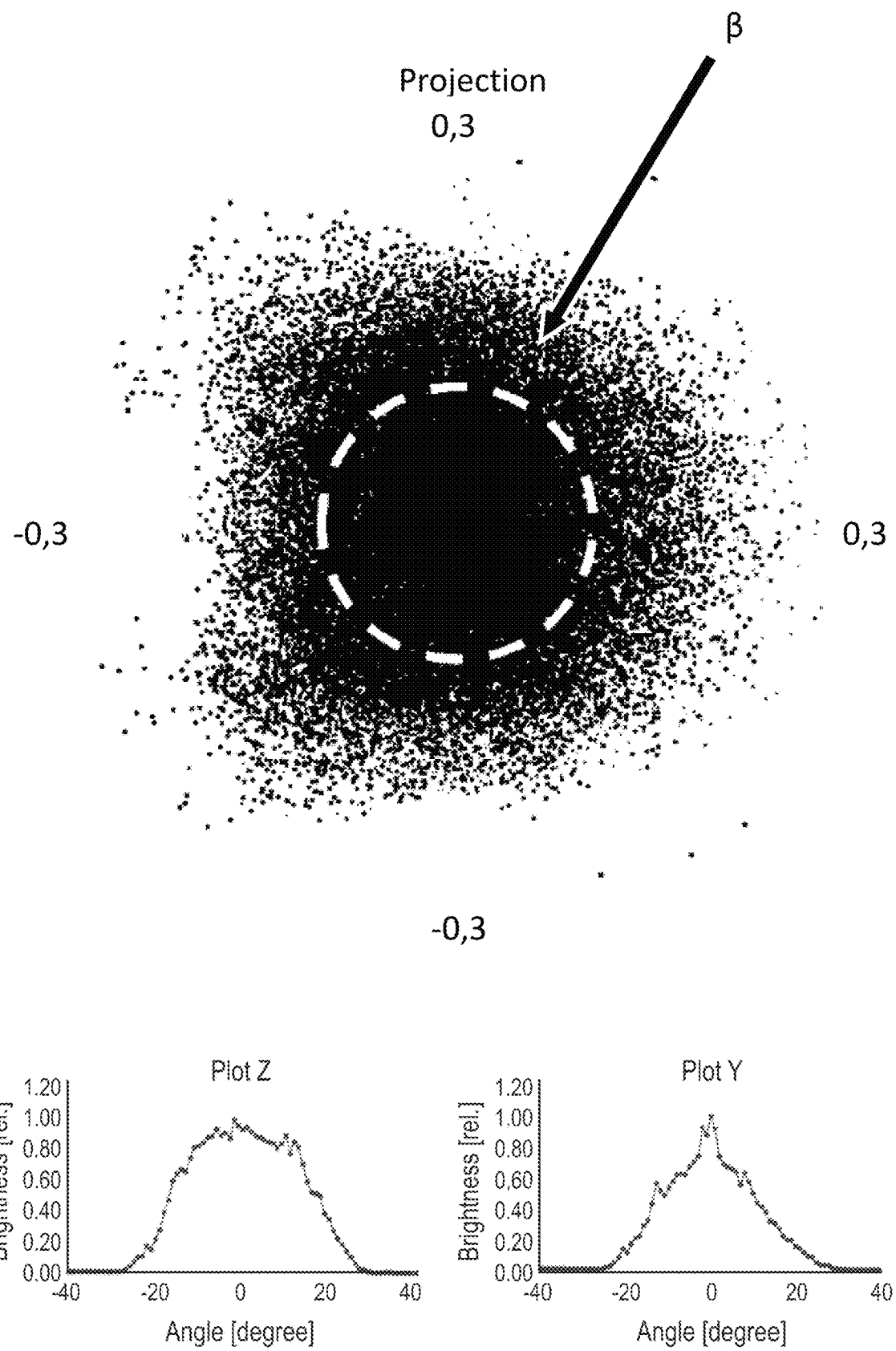

| FIG. 15 | Taper | Curve |
|---|---|---|
| Widening length | 5.00E−03 m | |
| Core radius light entry | 6.000E−05 m | 1.800E−04 m |
| Core radius light exit | 1.800E−04 m | |
| Bending radius | | 4.500E−03 m |
| Bending angle | | 40.00° |

Figure 16:
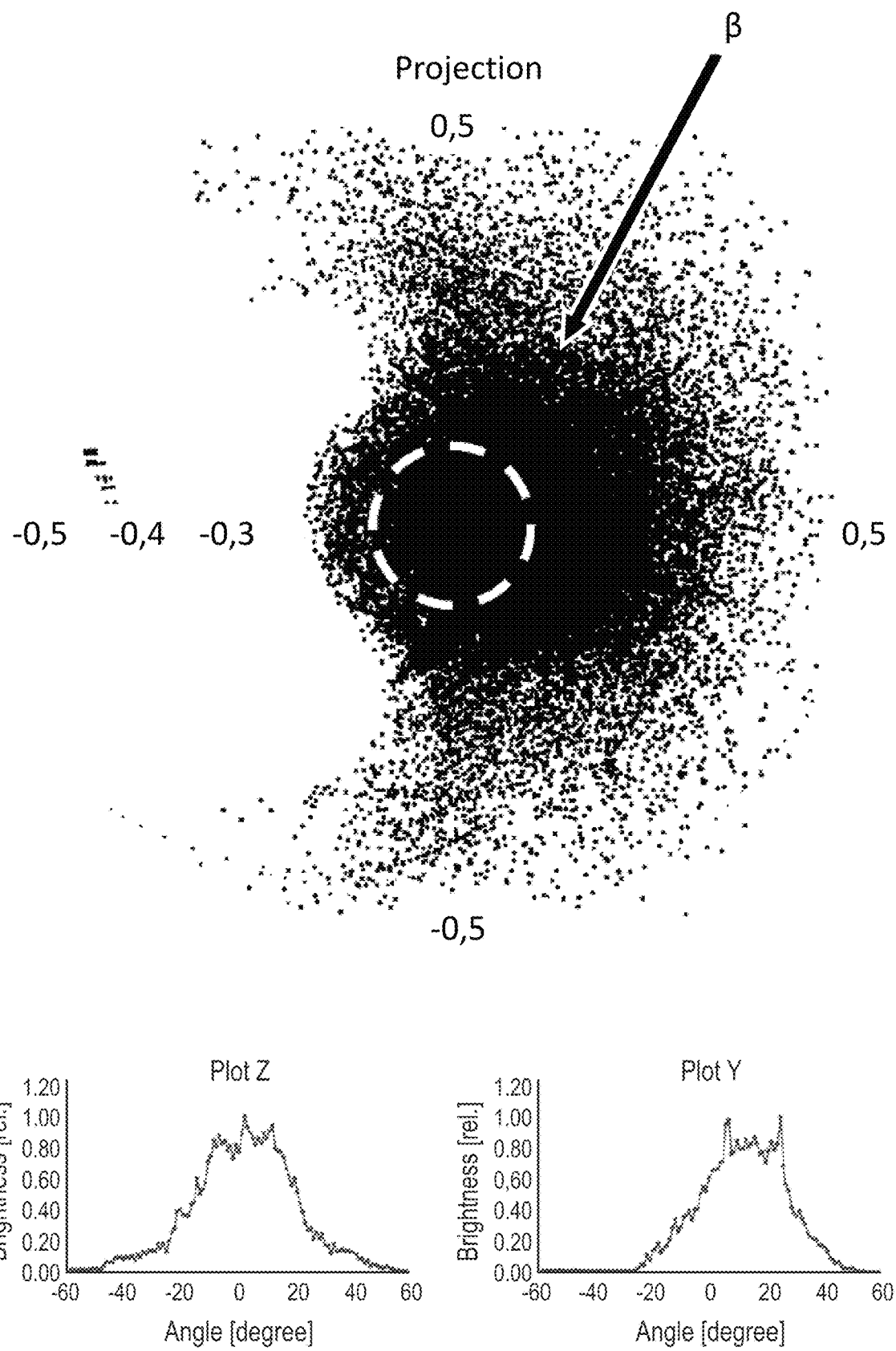

| FIG. 16 | Taper | Curve |
|---|---|---|
| Widening length | 5.00E−03 m | |
| Core radius light entry | 1.200E−04 m | 3.600E−04 m |
| Core radius light exit | 3.600E−04 m | |
| Bending radius | | 4.500E−03 m |
| Bending angle | | 40.00° |

Figure 17:
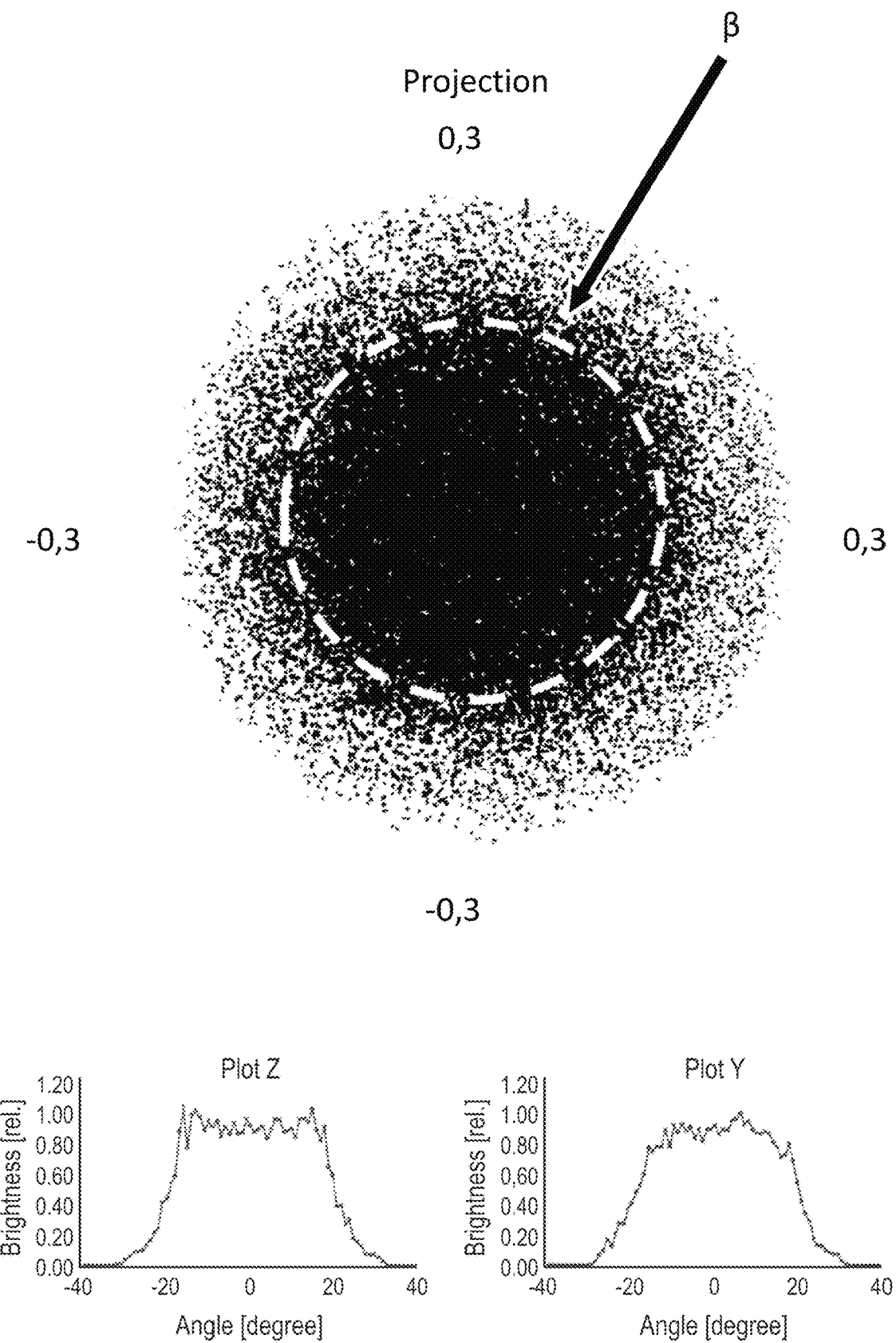

| FIG. 17 | Taper | Curve |
|---|---|---|
| Widening length | 5.00E-03 m | |
| Core radius light entry | 1.500E-05 m | 3.000E-05 m |
| Core radius light exit | 3.000E-05 m | |
| Bending radius | | 4.500E-03 m |
| Bending angle | | 40.00° |

Figure 18:
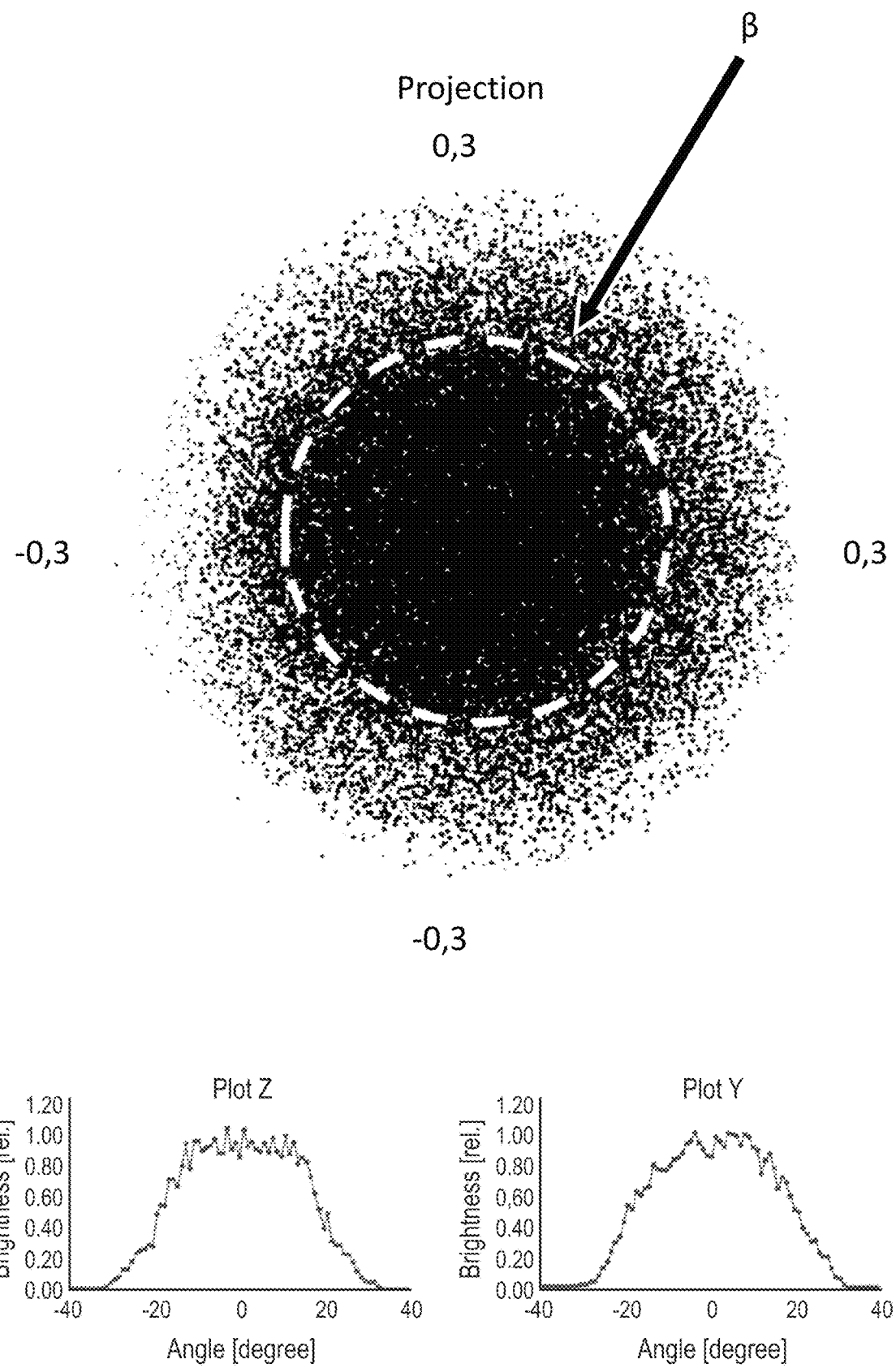

| FIG. 18 | Taper | Curve |
|---|---|---|
| Widening length | 5.00E-03 m | |
| Core radius light entry | 3.000E-05 m | 6.000E-05 m |
| Core radius light exit | 6.000E-05 m | |
| Bending radius | | 4.500E-03 m |
| Bending angle | | 40.00° |

Figure 19:
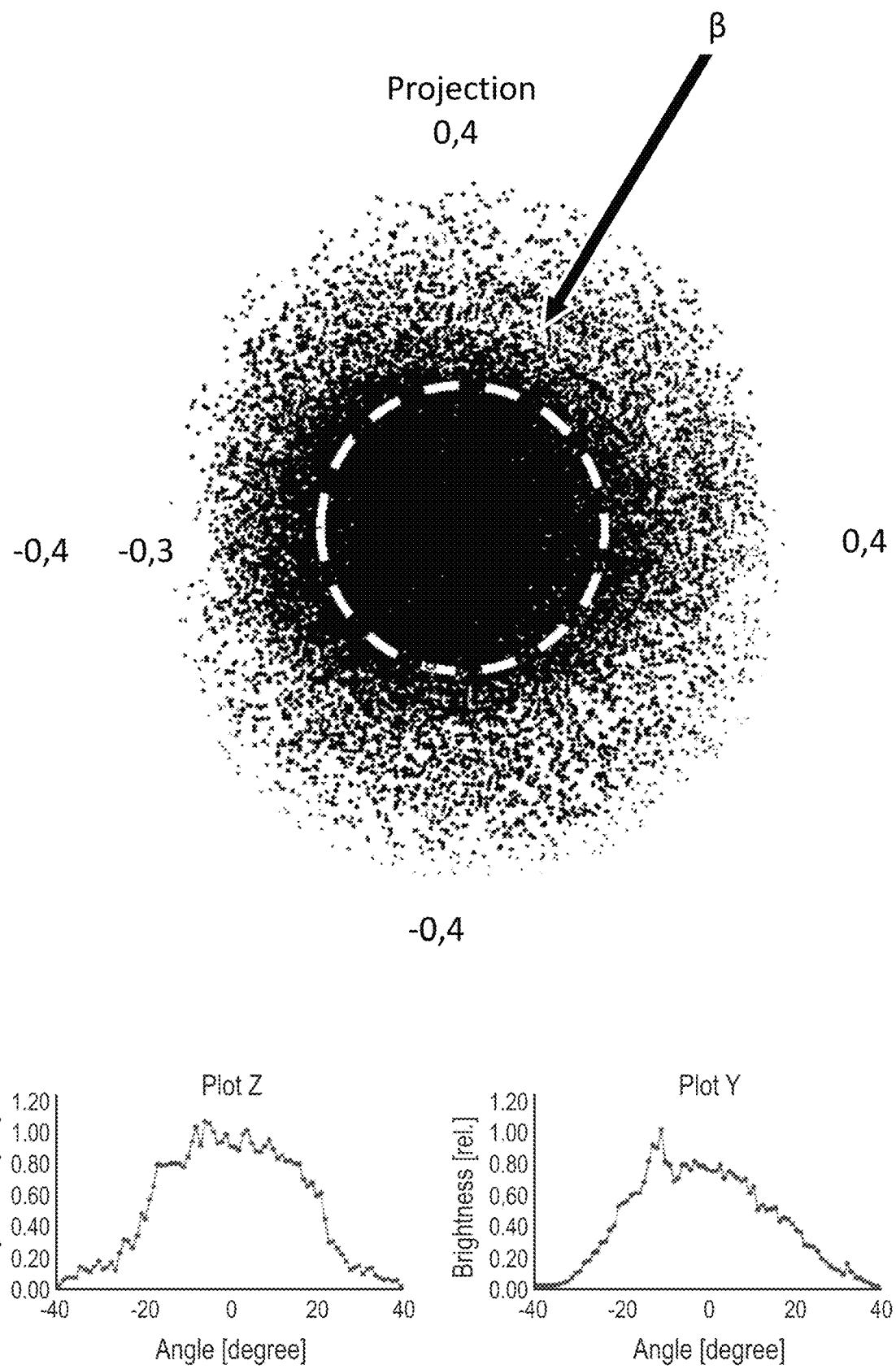

| FIG. 19 | Taper | Curve |
|---|---|---|
| Widening length | 5.00E-03 m | |
| Core radius light entry | 6.000E-05 m | 1.200E-04 m |
| Core radius light exit | 1.200E-04 m | |
| Bending radius | | 4.500E-03 m |
| Bending angle | | 40.00° |

Figure 20:
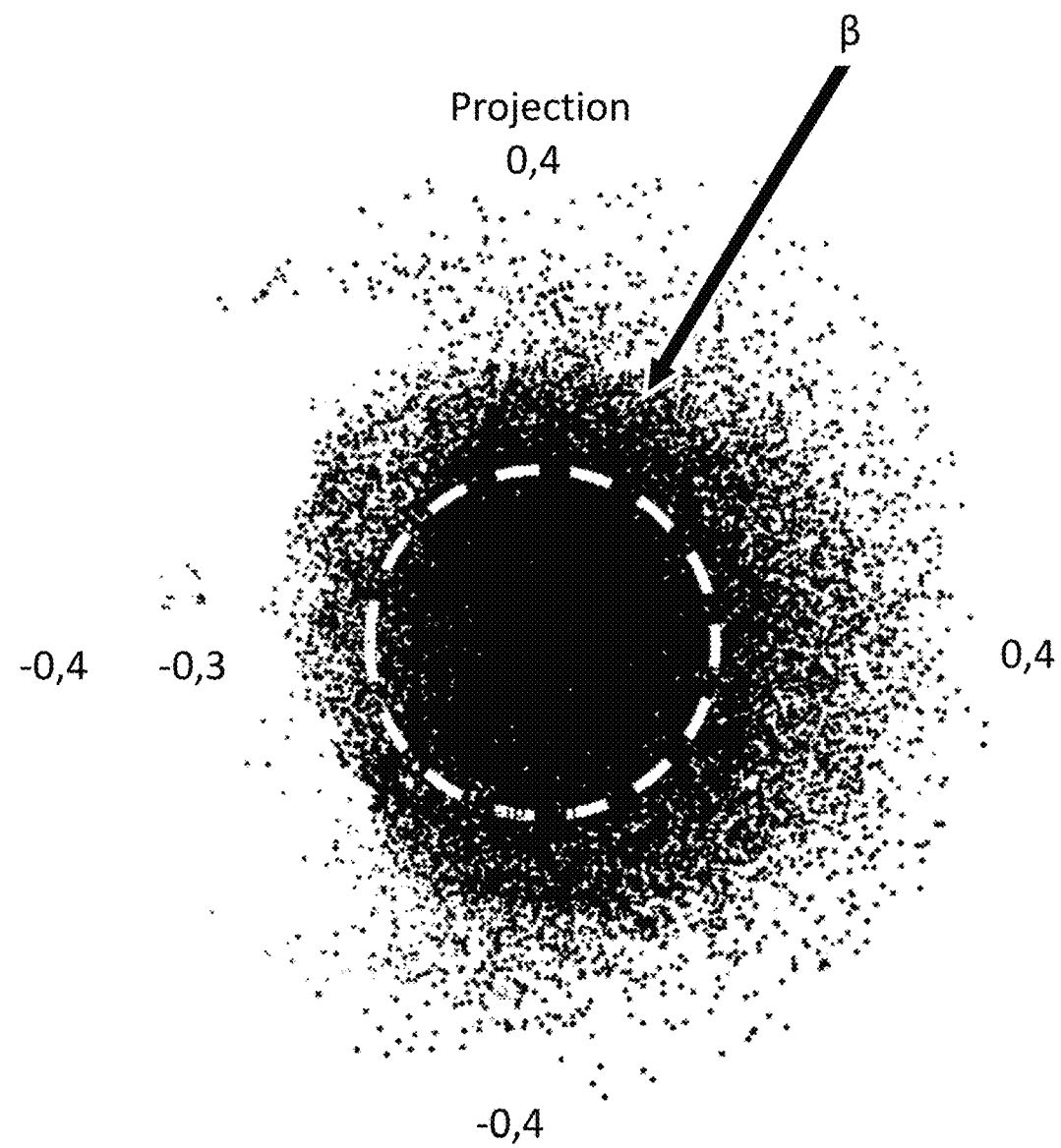
Figure 20:
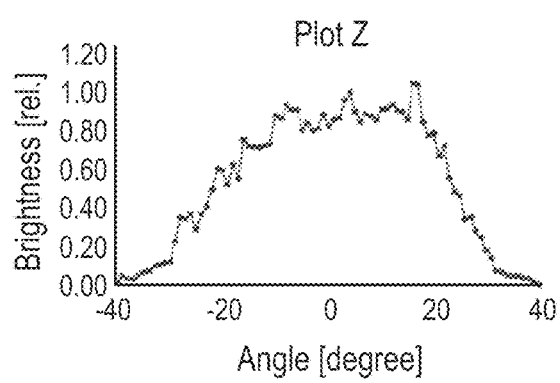
Figure 20:
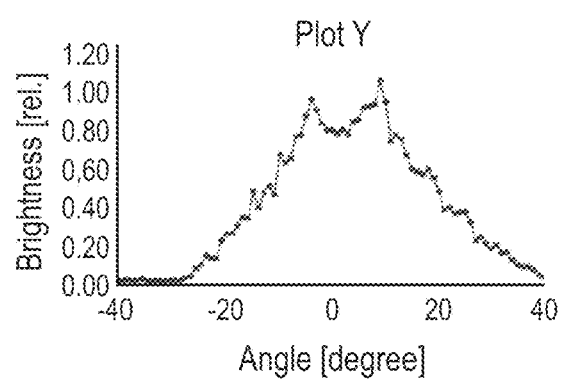

| FIG. 20 | Taper | Curve |
|---|---|---|
| Widening length | 5.00E-03 m | |
| Core radius light entry | 1.200E-04 m | 2.400E-04 m |
| Core radius light exit | 2.400E-04 m | |
| Bending radius | | 4.500E-03 m |
| Bending angle | | 40.00° |

Figure 21:
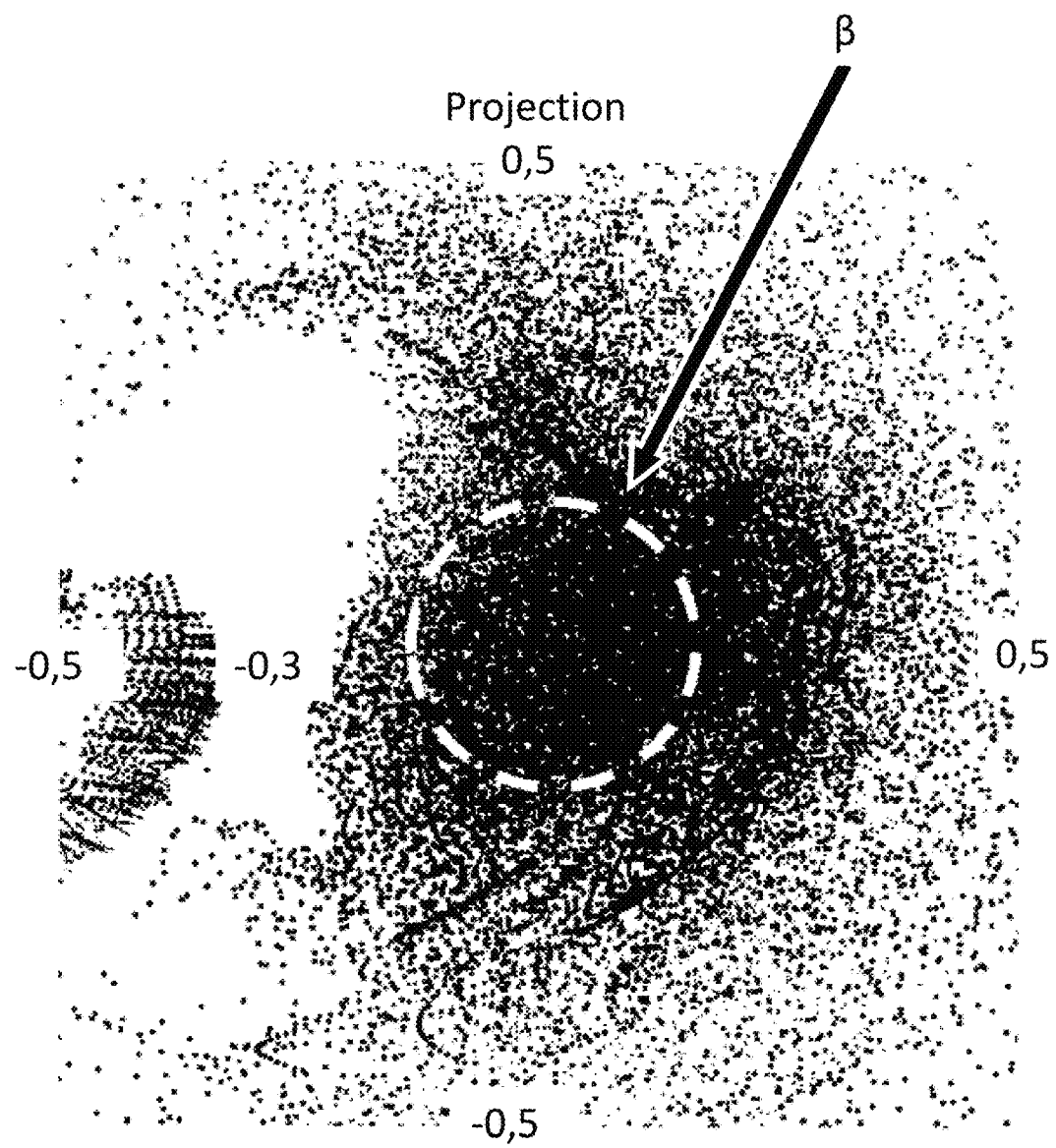
Figure 21:
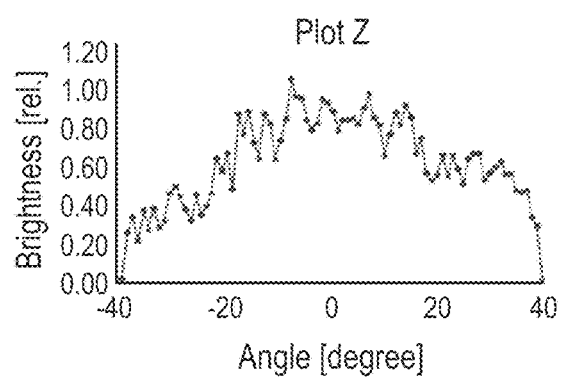
Figure 21:
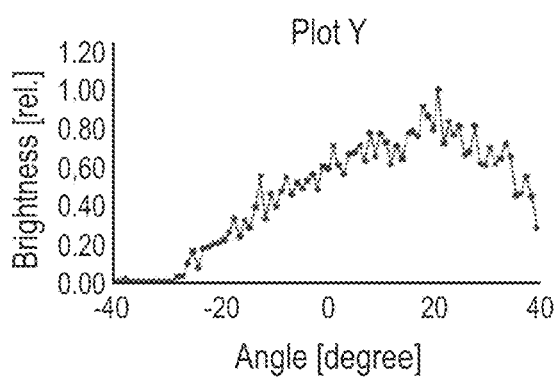

| FIG. 21 | Taper | Curve |
|---|---|---|
| Widening length | 5.00E-03 m | |
| Core radius light entry | 2.500E-04 m | 5.000E-04 m |
| Core radius light exit | 5.000E-04 m | |
| Bending radius | | 4.500E-03 m |
| Bending angle | | 40.00° |

Figure 22:
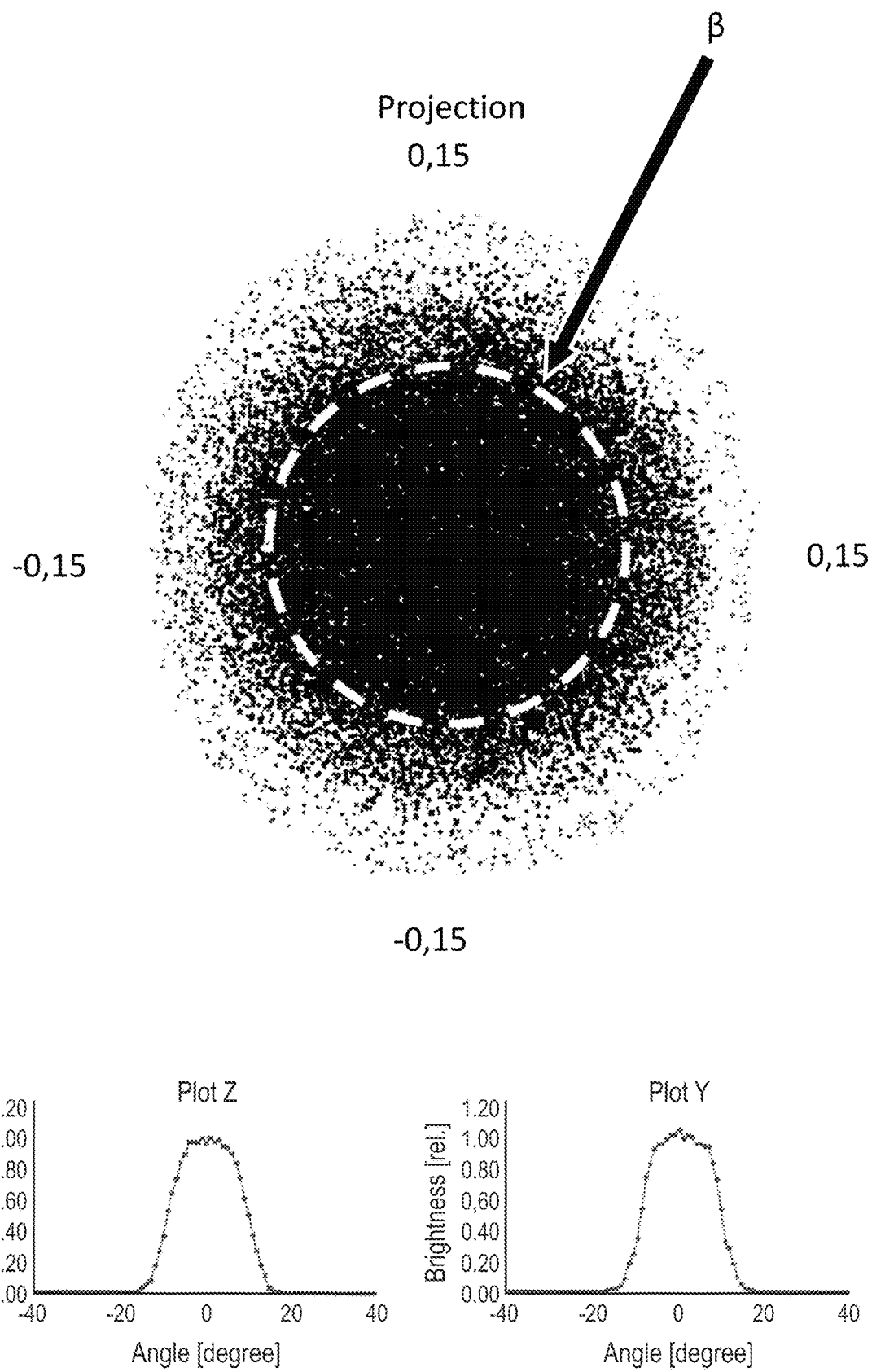

| FIG. 22 | Taper | Curve |
|---|---|---|
| Widening length | 5.00E-03 m | |
| Core radius light entry | 4.000E-06 m | 1.600E-05 m |
| Core radius light exit | 1.600E-05 m | |
| Bending radius | | 4.500E-03 m |
| Bending angle | | 40.00° |

Figure 23:
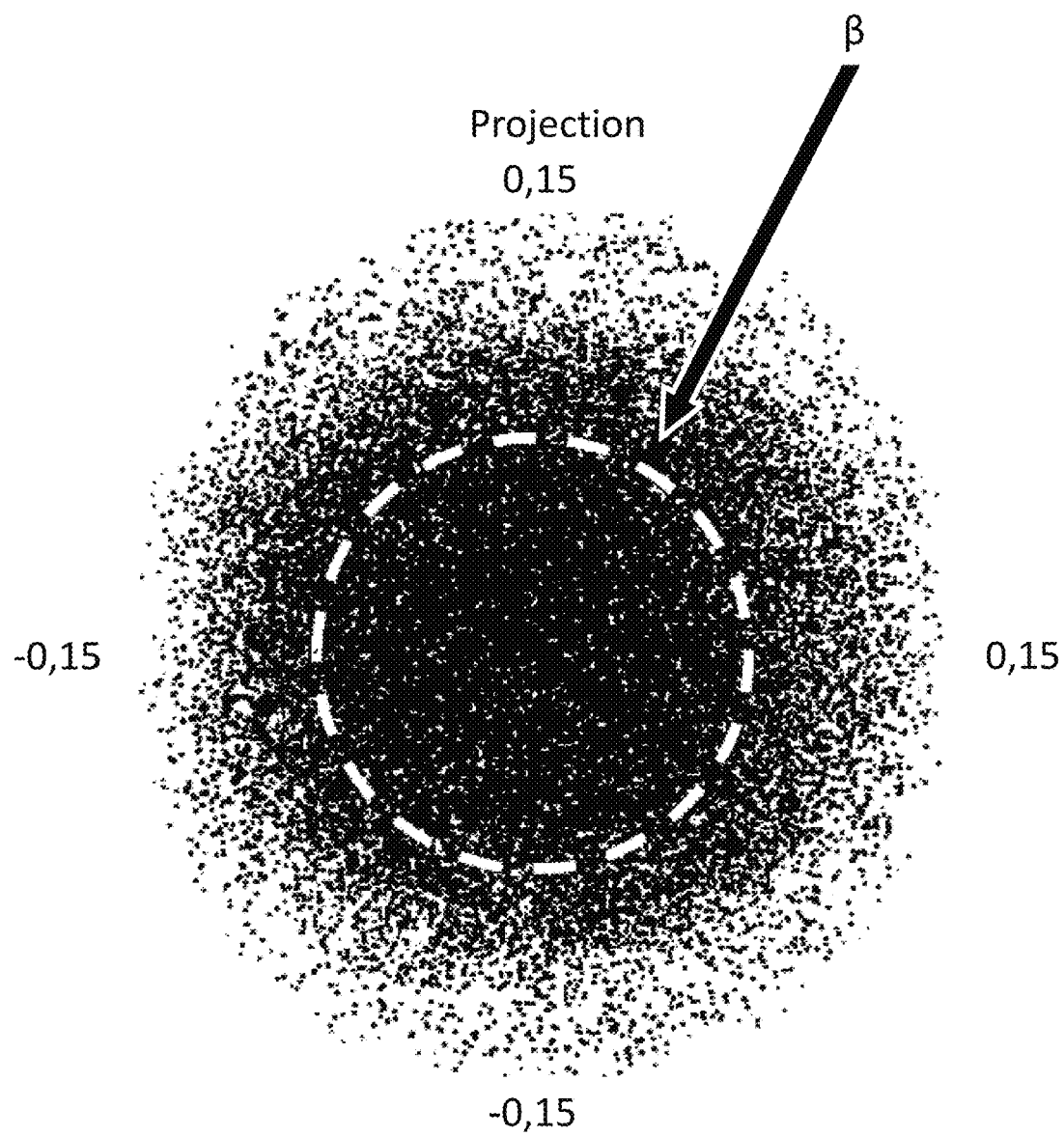
Figure 23:
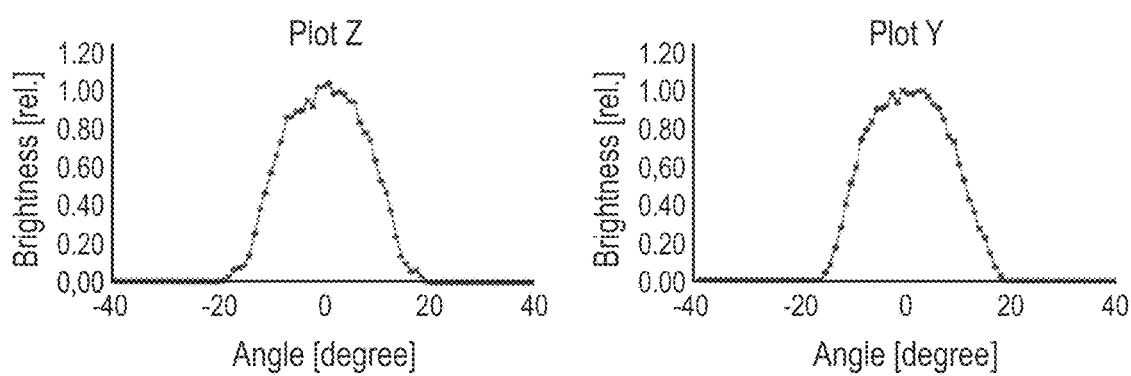

| FIG. 23 | Taper | Curve |
|---|---|---|
| Widening length | 5.00E-03 m | |
| Core radius light entry | 7.500E-06 m | 3.000E-05 m |
| Core radius light exit | 3.000E-05 m | |
| Bending radius | | 4.500E-03 m |
| Bending angle | | 40.00° |

Figure 24:
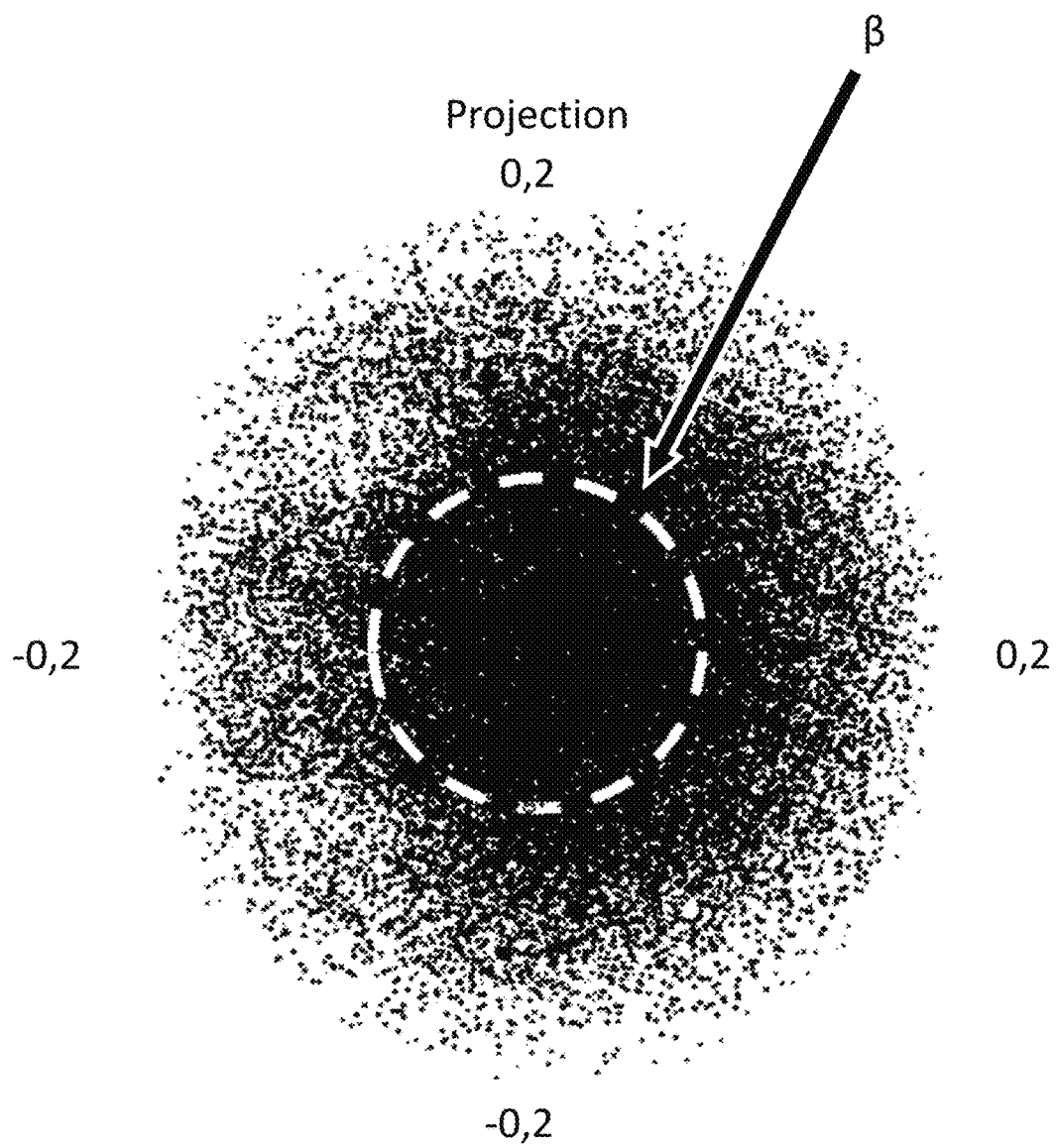
Figure 24:
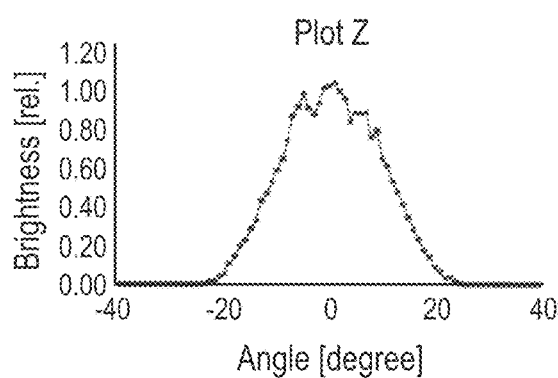
Figure 24:
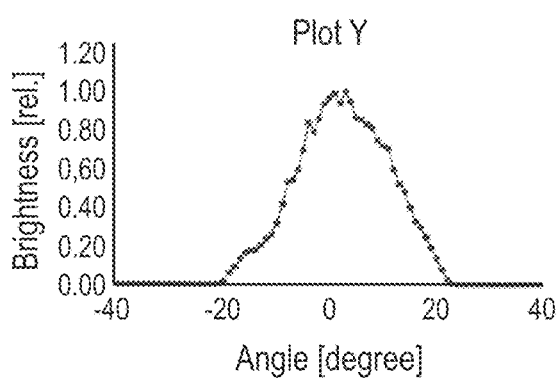

| FIG. 24 | Taper | Curve |
|---|---|---|
| Widening length | 5.00E-03 m | |
| Core radius light entry | 1.500E-05 m | 6.000E-05 m |
| Core radius light exit | 6.000E-05 m | |
| Bending radius | | 4.500E-03 m |
| Bending angle | | 40.00° |

Figure 25:
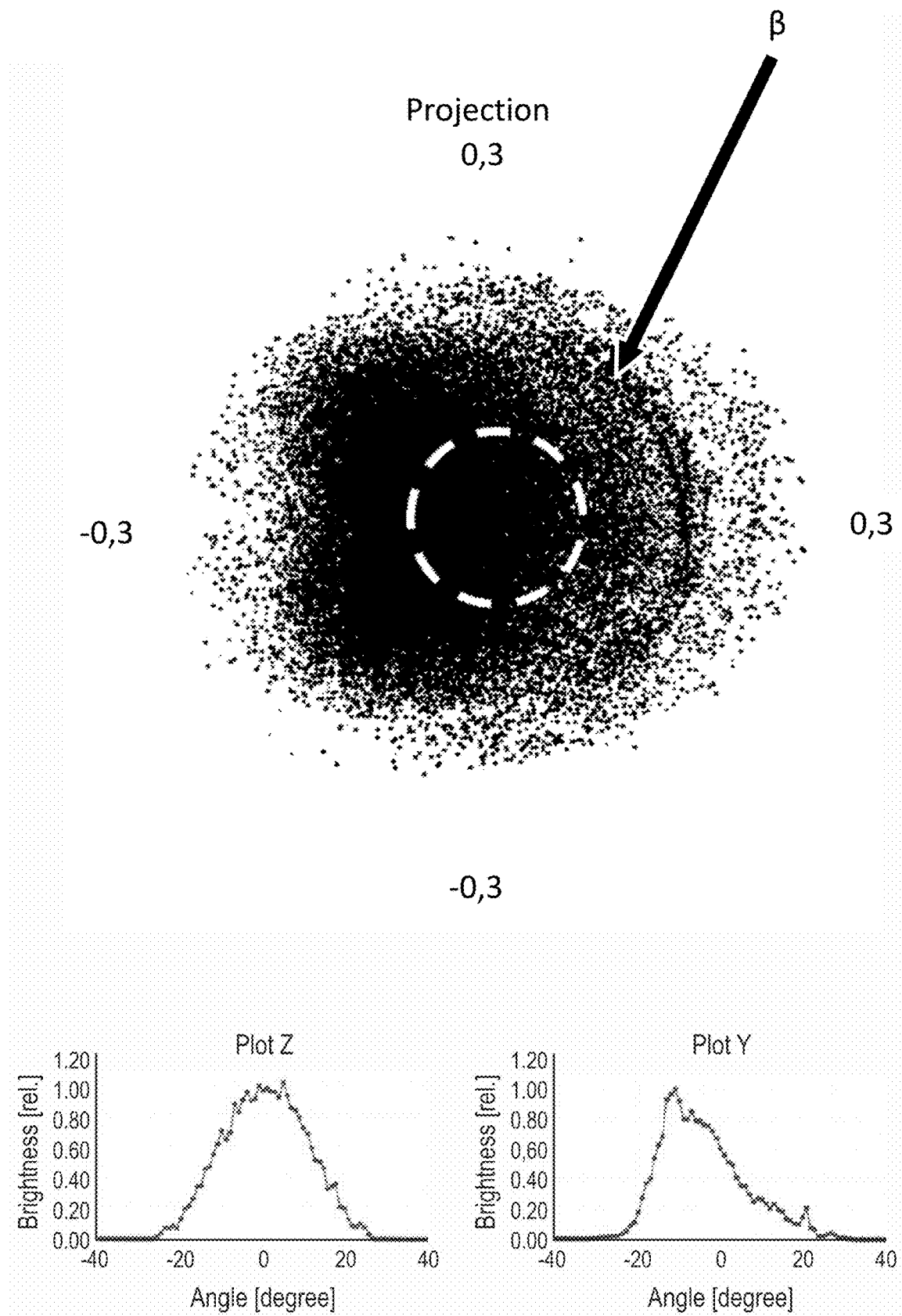

| FIG. 25 | Taper | Curve |
|---|---|---|
| Widening length | 5.00E-03 m | |
| Core radius light entry | 3.000E-05 m | 1.200E-04 m |
| Core radius light exit | 1.200E-04 m | |
| Bending radius | | 4.500E-03 m |
| Bending angle | | 40.00° |

Based on the simulations, in particular with the definitions described above, it is possible to determine the following values or triples for inhomogeneity, roundness, and stray light proportion, and/or to determine an emission angle for obtaining these values or triples:

| FIG. 13: Inhomogeneity | Roundness | Stray light effect |
|---|---|---|
| 0.199 | 0.878 | 0.028 |

| FIG. 14: Inhomogeneity | Roundness | Stray light effect |
|---|---|---|
| 0.143 | 0.822 | 0.128 |

| FIG. 15 Inhomogeneity | Roundness | Stray light effect |
|---|---|---|
| 0.206 | 0.595 | 0.100 |

| FIG. 16 Inhomogeneity | Roundness | Stray light effect |
|---|---|---|
| 0.345 | 0.154 | 0.922 |

| FIG. 17 Inhomogeneity | Roundness | Stray light effect |
|---|---|---|
| 0.146 | 0.891 | 0.014 |

| FIG. 18 Inhomogeneity | Roundness | Stray light effect |
|---|---|---|
| 0.172 | 0.906 | 0.020 |

| FIG. 19 | | |
|---|---|---|
| Inhomogeneity | Roundness | Stray light effect |
| 0.187 | 0.742 | 0.066 |

| FIG. 20 | | |
|---|---|---|
| Inhomogeneity | Roundness | Stray light effect |
| 0.248 | 0.426 | 0.068 |

| FIG. 21 | | |
|---|---|---|
| Inhomogeneity | Roundness | Stray light effect |
| 0.304 | 0.230 | 0.765 |

| FIG. 22 | | |
|---|---|---|
| Inhomogeneity | Roundness | Stray light effect |
| 0.162 | 0.945 | 0.001 |

| FIG. 23 | | |
|---|---|---|
| Inhomogeneity | Roundness | Stray light effect |
| 0.125 | 0.948 | 0.049 |

| FIG. 24 | | |
|---|---|---|
| Inhomogeneity | Roundness | Stray light effect |
| 0.186 | 0.575 | 0.167 |

| FIG. 25 | | |
|---|---|---|
| Inhomogeneity | Roundness | Stray light effect |
| 0.355 | 0.334 | 0.442 |

Figure 26:
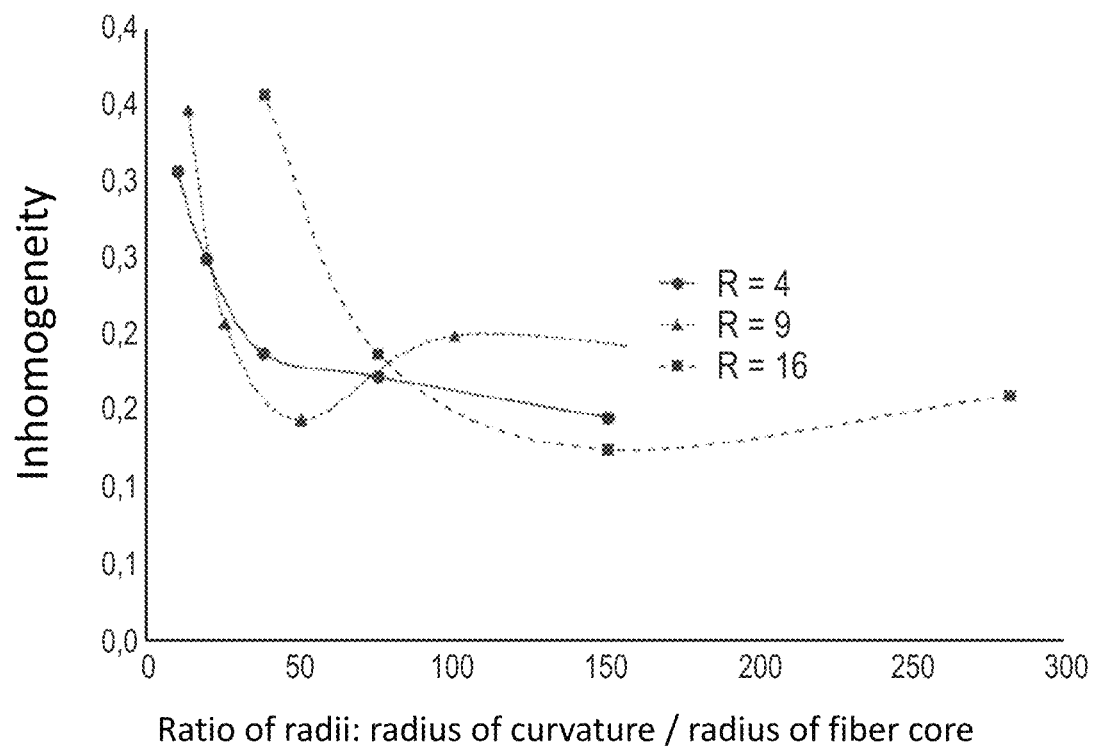
FIG. 26 shows exemplary values of inhomogeneity plotted over the quotient of radius of curvature and radius of fiber core.
Figure 27:
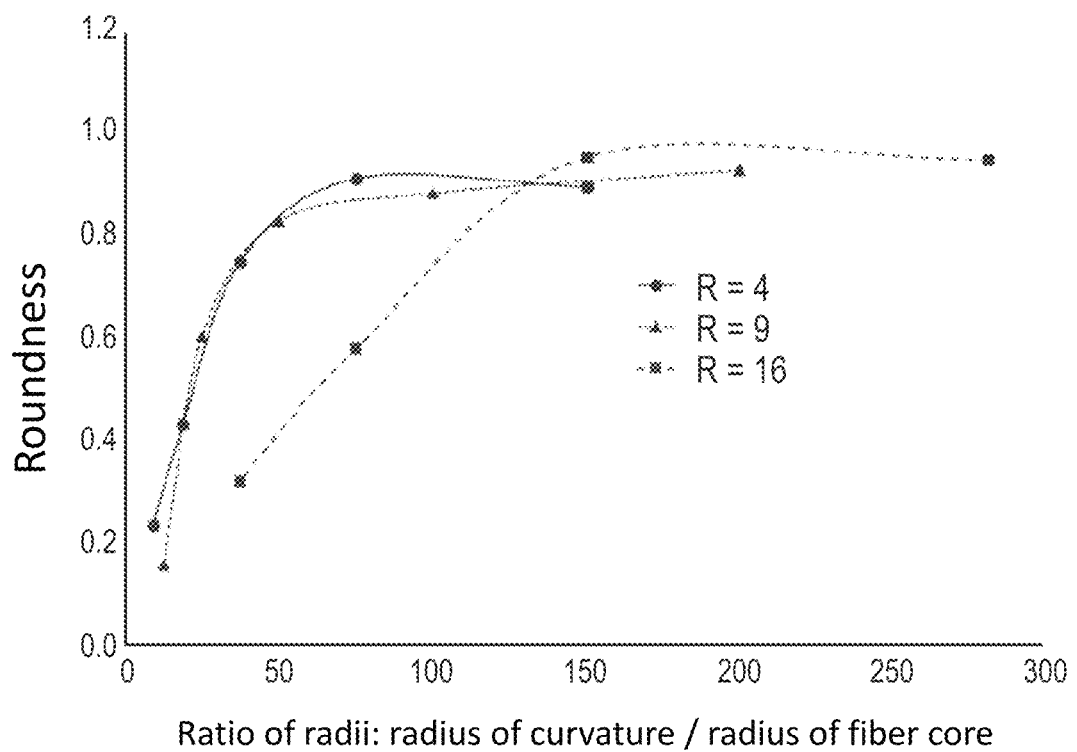
FIG. 27 shows exemplary values of roundness plotted over the quotient of radius of curvature and radius of fiber core.
Figure 28:
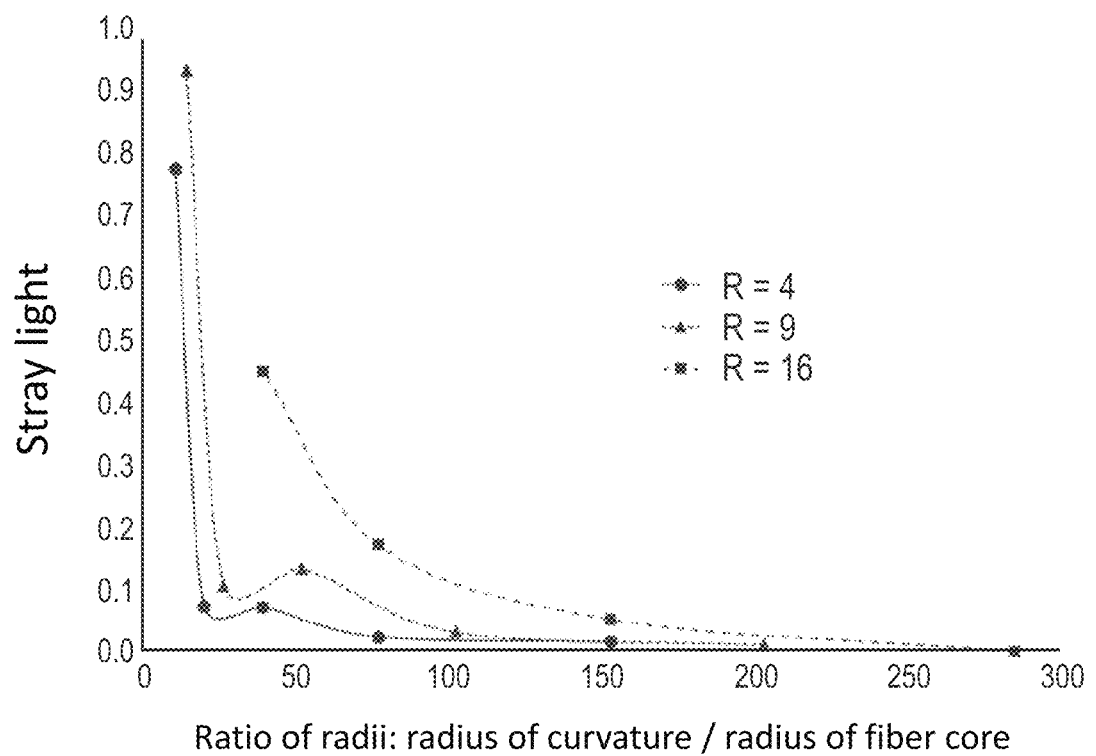
FIG. 28 shows exemplary values of stray light proportion plotted over the quotient of radius of curvature and radius of fiber core.

FIGS. 26, 27, and 28 give an overview of inhomogeneity, roundness, and stray light effect. The values are plotted over the ratio of radius of curvature in curved section 140 (cf. FIGS. 9, 10) to radius of the fiber core. In the figures, R denotes the ratio of light exit face to light entry face.

Figure 29:
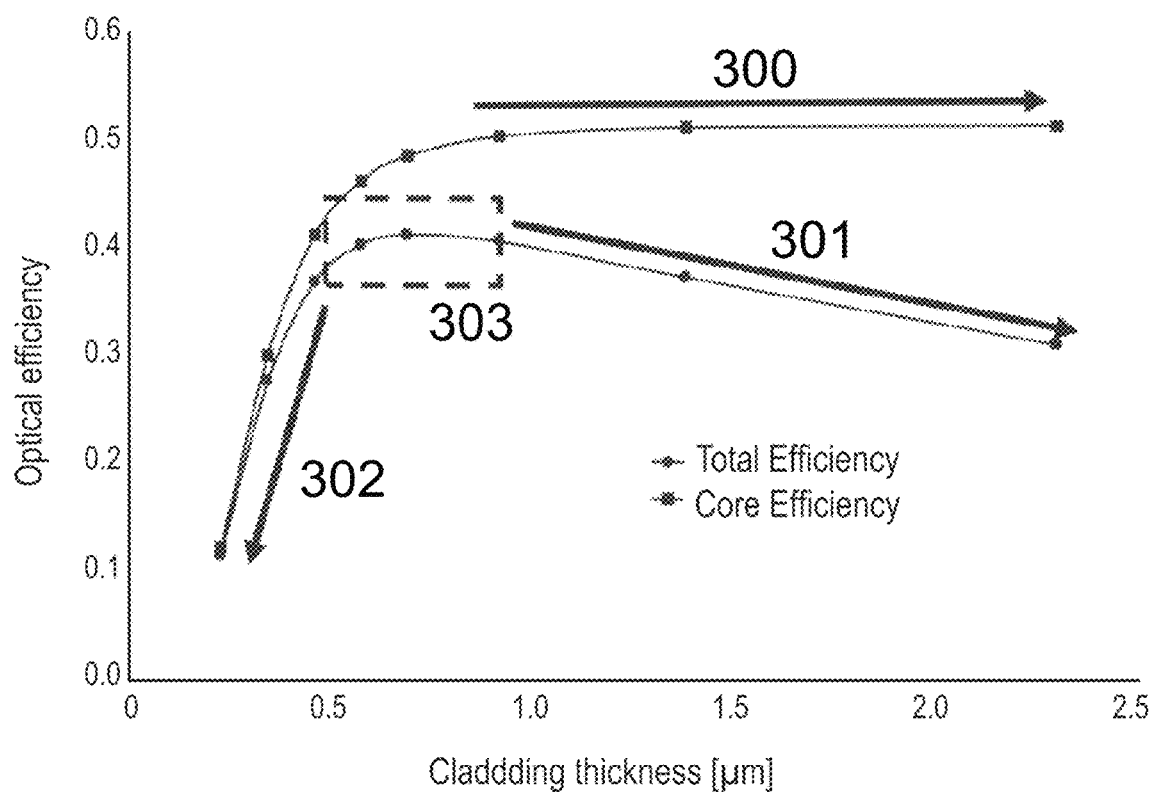
FIGS. 29-30 show exemplary values of optical efficiency plotted over the cladding thickness.

FIG. 29 shows the optical efficiency plotted over cladding thickness, in μm, for an exemplary optical element with a refractive index of 1.624 for the core and of 1.492 for the cladding. Based thereon, the influence of the cladding thickness can be described as follows. Along arrow 300, a greater cladding thickness will not improve light conduction but to an insignificant extent. Along arrow 301, the overall efficiency decreases, since a greater percentage of light is injected into the cladding. Along arrow 302, efficiency is decreasing, since light is no longer completely guided because of the thin cladding. On this basis, an optimum range is obtained, which is indicated by a dashed box 303.

Figure 30:
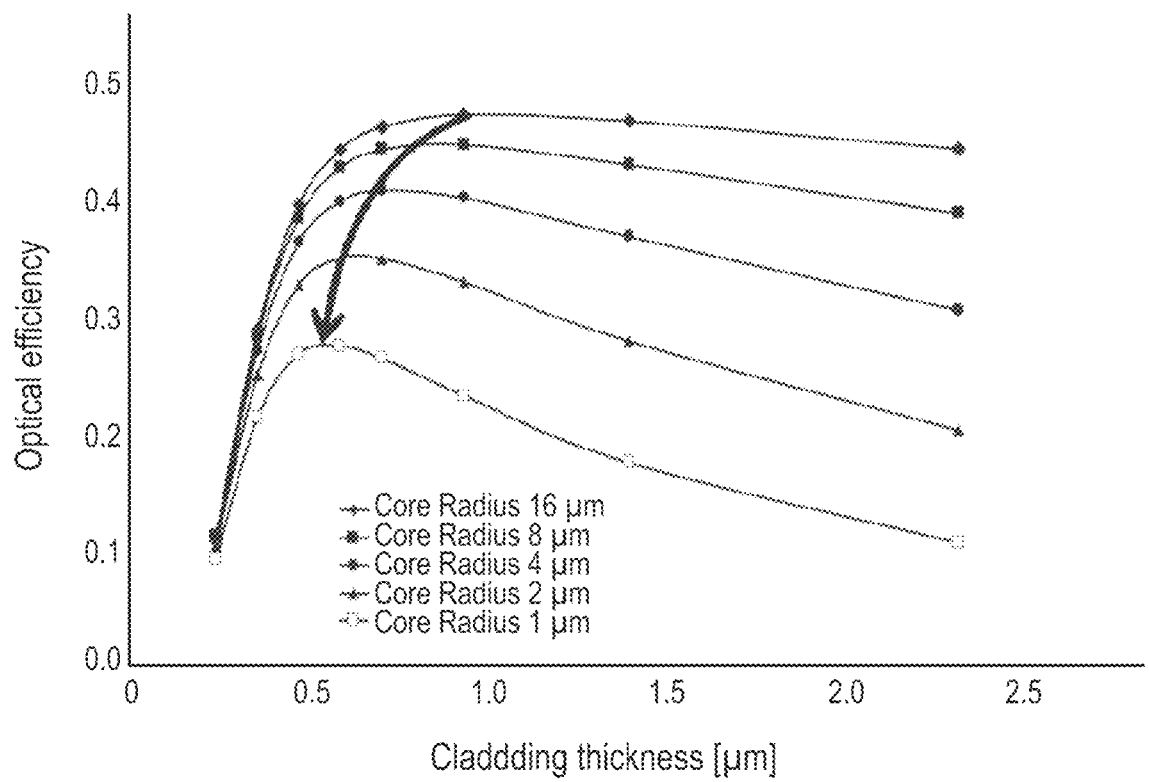

FIG. 30 shows the optical efficiency plotted over cladding thickness, in m, for an exemplary optical element for different core radii. As will be apparent therefrom, the smaller the core radius, the lower the maximum overall efficiency that can be achieved. The effect is particularly pronounced below 4 μm, since the core diameter and the optimum cladding thickness are in the order of magnitude of the wavelength of visible light. An upper limit for the core radius is determined by the requirement for narrow light guidance. A lower limit for the core radius is determined by the achievable efficiency.

Figure 31:
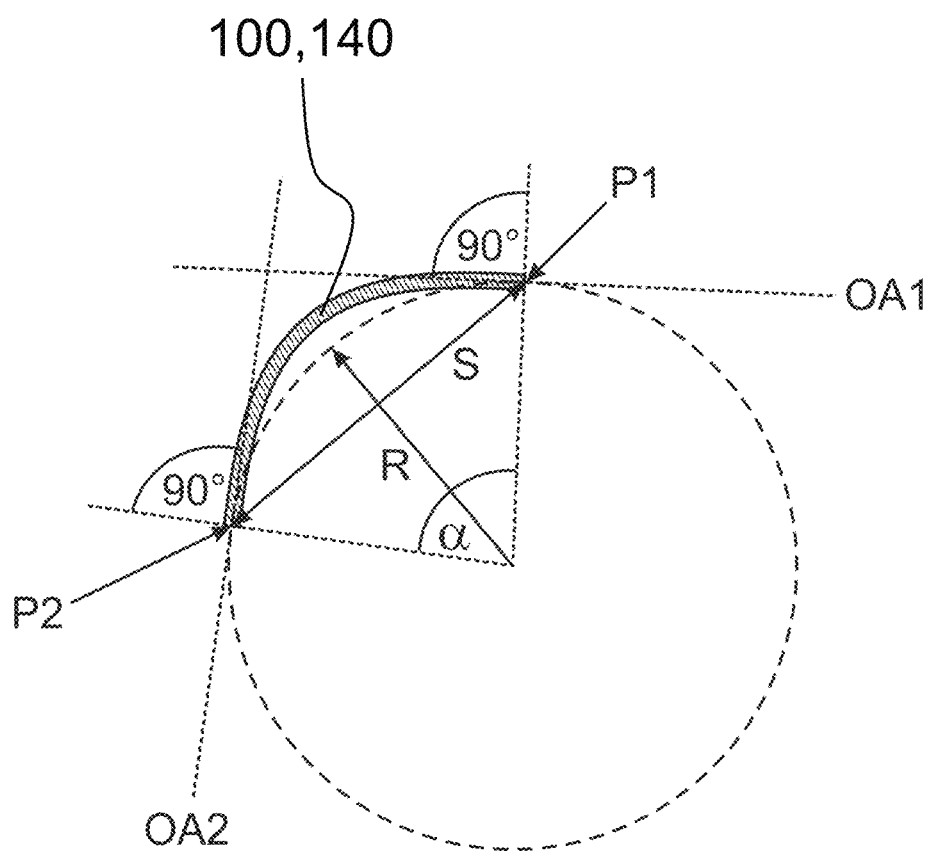
FIG. 31 schematically illustrates a curved section within which the optical axis extends in a curved manner, and the associated equivalent radius of curvature.

FIG. 31 shows a portion of an optical element 100, namely its curved section 140 within which the optical axis extends in a curved manner. In this example, the optical axis of the optical element does not extend along an ideal circular arc. Curved section 140 begins at point P1 and terminates at point P2. The two points are spaced apart from one another by a distance s. The direction of the optical axis changes by an angle $\alpha$ (optical axis OA1 at point P1 and optical axis OA2 at point P2 enclose an angle $\alpha$). With distance s and angle $\alpha$, the radius R of an arc can be calculated, which also connects the points P1 and P2: $R=s/(2*\sin(\alpha/2))$. That is, a circular arc with this radius leads to the same angular change of the optical axis between the two points. R is referred to as the equivalent radius of curvature.

What is claimed is:

1. A lighting device, comprising:
a light source configured to emit primary light having a primary emission characteristic; and
an optical element having a light entry face and a light exit face, the optical element comprising a plurality of light guiding elements each forming part of the light entry face and part of the light exit face, the light entry face being configured to inject the primary light into the optical element, the plurality of light guiding elements each having a boundary surface extending between the light entry face and the light exit face, the boundary surface totally internally reflecting the primary light so that the light exit face emits a secondary light from the optical element,
wherein the optical element is configured to reduce a divergence of the primary light such that the secondary light has a secondary emission characteristic with an emission angle ($\beta$) that is smaller than an emission angle ($\alpha$) of the primary emission characteristic,
wherein the plurality of light guiding elements each have a cross-sectional area at the light exit face that is larger than a cross-sectional area at the light entry face such that the light exit face is larger than the light entry face,
wherein the plurality of light guiding elements are bonded to one another or fused to one another, and
wherein the optical element comprises a widening section including a section having an increasing opening angle.

2. The lighting device of claim 1, wherein the light exit face has an optical axis that extends obliquely to an optical axis of the light entry face such that the secondary light is emitted from the light exit face in a different direction than the primary light is injected into the light entry face.

3. The lighting device of claim 1, wherein the optical element comprises a feature selected from a group consisting of: the widening section increases conically; a curved section within which an optical axis of the optical element extends along a curve; a curved section within which an optical axis of the optical element extends along a circular arc; the widening section and a curved section that are spaced apart from one another along an optical axis of the optical element; the widening section and a curved section that are spaced apart from one another along an optical axis of the optical element with the widening section being closer to the light entry face and the curved section being located closer to the light exit face; a linear section and the widening section, the linear section having a constant cross-sectional area that extends in a straight line along an optical axis of the optical element, the linear section being before and/or after the widening section and having a smaller cross-sectional area than the widening section; a linear section and a curved section, the linear section having a constant cross-sectional area that extends in a straight line along an optical axis of the optical element, the curved section extending along a curve with respect to the optical axis, the linear section being before and/or after the linear section; the widening section and a linear section formed monolithically with one another along an optical axis of the optical element; a curved section and a linear section formed monolithically with one another along an optical axis of the optical element; a curved section, a linear section, and the widened section formed monolithically with one another along an optical axis of the optical element; and any combinations thereof.

4. The lighting device of claim 1, further comprising a feature selected from a group consisting of: the emission angle (β) of the secondary emission characteristic being less than 60 degrees; the emission angle (β) of the secondary emission characteristic being less than 50 degrees; the emission angle (β) of the secondary emission characteristic being less than 40 degrees; a ratio defined between the emission angle (β) of the secondary emission characteristic and the emission angle (α) of the primary emission characteristic that is less than 0.7; a ratio defined between the emission angle (β) of the secondary emission characteristic and the emission angle (α) of the primary emission characteristic that is less than 0.6; a ratio defined between the emission angle (β) of the secondary emission characteristic and the emission angle (α) of the primary emission characteristic that is less than 0.5; a ratio $(\sin \alpha/\sin \beta)^2$ for the emission angle (α) of the primary emission characteristic and the emission angle (β) of the secondary emission characteristic that is between 2 and 100; a ratio $(\sin \alpha/\sin \beta)^2$ for the emission angle (α) of the primary emission characteristic and the emission angle (β) of the secondary emission characteristic that is between 3 and 50; a ratio $(\sin \alpha/\sin \beta)^2$ for the emission angle (α) of the primary emission characteristic and the emission angle (β) of the secondary emission characteristic that is between 4 and 25; and a ratio $(\sin \alpha/\sin \beta)^2$ for the emission angle (α) of the primary emission characteristic and the emission angle (β) of the secondary emission characteristic that is between 5 and 15.

5. The lighting device of claim 1, wherein the secondary emission characteristic has a roundness of greater than 0.4, an inhomogeneity of less than 0.35, and a stray light proportion of less than 0.2.

6. The lighting device of claim 1, wherein the secondary emission characteristic has a roundness of greater than 0.85, an inhomogeneity of less than 0.2, and a stray light proportion of less than 0.05.

7. The lighting device of claim 1, further comprising a feature selected from a group consisting of: a ratio of a surface area of the light exit face to the light entry face between 2 and 100; a ratio of a surface area of the light exit face to the light entry face between 3 and 50; a ratio of a surface area of the light exit face to the light entry face between 4 and 25; a ratio of a surface area of the light exit face to the light entry face between 5 and 15; a ratio of a cross-sectional areas of the plurality of light guiding elements at the light exit face and the light entry face between 2 and 100; a ratio of a cross-sectional areas of the plurality of light guiding elements at the light exit face and the light entry face between 3 and 50; a ratio of a cross-sectional areas of the plurality of light guiding elements at the light exit face and the light entry face between 4 and 25; and a ratio of a cross-sectional areas of the plurality of light guiding elements at the light exit face and the light entry face between 5 and 15.

8. The lighting device of claim 1, wherein the optical element has a cross-sectional shape defined perpendicular to an optical axis having a shape selected from a group consisting of circular, angular, polygonal, and square.

9. The lighting device of claim 8, wherein the cross-sectional shape remains congruent along an entirety of the optical axis.

10. The lighting device of claim 1, further comprising an angle between an optical axis of the light exit face and an optical axis of the light entry face that is greater than 10 degrees.

11. The lighting device of claim 10, wherein the angle is greater than 80 degrees.

12. The lighting device of claim 10, wherein the optical element has a curved section extending along a circular arc with a radius of curvature that is greater than 2 millimeters and smaller than 40 millimeters.

13. The lighting device of claim 12, wherein the radius of curvature is greater than 32 millimeters.

14. The lighting device of claim 1, wherein the plurality of light guiding elements comprises at least 10,000 individual optical fibers bonded to one another and each comprising a core and a cladding, the core having a refractive index that is greater than a refractive index of the cladding.

15. The lighting device of claim 14, further comprising:
the widening section having a length along an optical axis of the optical element; and
a ratio of the length and a diameter of the core that is at least 10.

16. The lighting device of claim 14, further comprising:
a curved section within which an optical axis of the optical element extends along a curve; and
a ratio of a radius of curvature of the curved section and a diameter of the core of the plurality of light guiding elements is at least 10.

17. The lighting device of claim 14, wherein the core comprises or is made of a glass or a multi-component silicate glass that is free, except for unavoidable traces, of a material selected from a group consisting of lead, antimony, arsenic, $TiO_2$, $CeO_2$, $Nb_2O_5$, $MoO_3$, $Bi_2O_3$, PbO, CdO, $Tl_2O$, $As_2O_3$, $Sb_2O_3$, $SO_3$, $SeO_2$, $TeO_2$, BeO, $WO_3$, radioactive elements, coloring components, and any combinations thereof.

18. The lighting device of claim 1, wherein the plurality of light guiding elements further comprise a feature selected from a group consisting of: a numerical aperture in air of that is greater than 0.80; a numerical aperture in air that is greater than 0.85; a glass system that has an acceptance angle 2α for light to be guided of greater than 80°; and a glass system that has an acceptance angle 2α for light to be guided of greater than 100°.

19. The lighting device of claim 1, wherein the lighting device is configured for a use selected from a group consisting of: a cabin of an aircraft, a seat of an aircraft, a diagnostic device, a surgical device, and a therapeutic device.

20. The lighting device of claim 1, wherein the optical element has a dimension perpendicular to an optical axis at the light entry face that is less than 10 millimeters and is configured for installation behind an interior lining of an aircraft such that the optical axis of the light exit face extends obliquely relative to the interior lining.

21. An optical element, comprising:
a light entry face;
a light exit face; and
a plurality of light guiding elements each forming part of the light entry face and part of the light exit face, the light entry face being configured to inject primary light into the optical element, the plurality of light guiding elements each having a boundary surface extending between the light entry face and the light exit face, the boundary surface being configured to totally internally reflect the primary light and the light exit face being configured to emit secondary light from the optical element,
wherein the optical element is configured to reduce a divergence of the primary light such that the secondary light has a secondary emission characteristic with an emission angle ($\beta$) that is smaller than an emission angle ($\alpha$) of the primary emission characteristic,
wherein the plurality of light guiding elements each have a cross-sectional area at the light exit face that is larger than a cross-sectional area at the light entry face such that the light exit face is larger than the light entry face,
wherein the plurality of light guiding elements are bonded to one another or fused together, and
wherein the optical element comprises a widening section within which a cross-sectional area of the plurality of light guiding elements and of the optical element increases including a section having an increasing opening area.

* * * * *